(12) United States Patent
Marie et al.

(10) Patent No.: US 12,375,485 B2
(45) Date of Patent: Jul. 29, 2025

(54) SYSTEMS, METHODS, AND STORAGE MEDIA FOR CONTROLLING USER ACCESS TO AN APPLICATION

(71) Applicant: Strata Identity, Inc., Niwot, CO (US)

(72) Inventors: Christopher Marie, Denver, CO (US); Carl Eric Leach, Carlsbad, CA (US); Eric Olden, Niwot, CO (US); Warren Fernandes, Erie, CO (US)

(73) Assignee: Strata Identity Inc., Niwot, CO (US)

( * ) Notice: Subject to any disclaimer, the term of this patent is extended or adjusted under 35 U.S.C. 154(b) by 155 days.

(21) Appl. No.: 18/317,657

(22) Filed: May 15, 2023

(65) Prior Publication Data
US 2023/0370456 A1 Nov. 16, 2023

Related U.S. Application Data

(60) Provisional application No. 63/341,672, filed on May 13, 2022.

(51) Int. Cl.
*H04L 9/40* (2022.01)
(52) U.S. Cl.
CPC ........ *H04L 63/0876* (2013.01); *H04L 63/102* (2013.01); *H04L 63/108* (2013.01)
(58) Field of Classification Search
CPC . H04L 63/0876; H04L 63/102; H04L 63/108; H04L 63/0815; H04L 63/0884
See application file for complete search history.

(56) References Cited

U.S. PATENT DOCUMENTS

| | | | |
|---|---|---|---|
| 11,362,900 B2 | 6/2022 | Olden et al. | |
| 11,444,925 B1* | 9/2022 | Patimer | H04L 67/147 |
| 11,818,114 B2 | 11/2023 | Olden et al. | |
| 11,876,796 B2 | 1/2024 | Olden et al. | |
| 11,973,749 B2 | 4/2024 | Olden et al. | |
| 11,995,174 B2 | 5/2024 | Olden et al. | |
| 2021/0360034 A1 | 11/2021 | Olden et al. | |
| 2021/0409409 A1* | 12/2021 | Palanisamy | H04L 63/08 |
| 2024/0114019 A1 | 4/2024 | Olden et al. | |

* cited by examiner

*Primary Examiner* — Izunna Okeke
(74) *Attorney, Agent, or Firm* — NOD LAW PC

(57) ABSTRACT

A system for controlling user access to an application is disclosed, where the system is configured to receive a request to access the application from a user, the application associated with an identity provider and a datastore; route the request to an intermediary; redirect the request to an identity provider for authentication; authenticate a user with the application based on receiving application identity information at the identity provider; generate a temporary user credential at the intermediary; provide the request along with the temporary user credential to the application; capture a backchannel request from the application to the datastore; confirm that the temporary user credential matches the one previously generated; send confirmation to the application that the temporary user credential enables user access to the application; send communication from the application to the user granting the user access to the application.

20 Claims, 11 Drawing Sheets

SYSTEMS, METHODS, AND STORAGE MEDIA FOR CONTROLLING USER ACCESS TO AN APPLICATION

CROSS-REFERENCE TO RELATED APPLICATIONS

The present application for patent claims priority to U.S. Provisional Application No. 63/341,672, entitled "Systems, Methods, and Storage media for Controlling User Access to an Application," filed May 13, 2022, assigned to the assignee hereof, the contents of which are incorporated herein by reference in their entirety and for all proper purposes. The present application for patent is also related to U.S. application Ser. Nos. 17/345,470, 17/344,585, 17/341,597, 17/329,107, 17/317,156, and 17/217,422, assigned to the assignee hereof, the contents of which are incorporated herein by reference in their entirety and for all proper purposes.

FIELD OF THE DISCLOSURE

The present disclosure relates to systems, methods, and storage media for controlling user access to an application.

BACKGROUND

Legacy applications are often tightly coupled with their mechanisms of authenticating users. Often this authentication involves the application making direct requests to an identity store (for instance, a Lightweight Directory Access Protocol or LDAP directory, or a database) to obtain user credentials information (e.g., password information) which is then validated against the user's provided password. In some circumstances, this tight coupling becomes problematic, for example, when the application's identity infrastructure needs to be modernized. In some cases, the entire application needs to be rewritten so it is compatible with the new identity infrastructure, which is time consuming, resource intensive, and expensive.

The description provided in the background section should not be assumed to be prior art merely because it is mentioned in or associated with the background section. The background section may include information that describes one or more aspects of the subject technology.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below Broadly, aspects of the present disclosure are directed to a system (e.g., shown as system 100 in FIG. 1) that enables an application's identity infrastructure to be modernized without altering the application's own internal understanding of the authentication process, further described in relation to the figures below. In some aspects, the present disclosure enables the identity infrastructure used to access an application to be modified or modernized (e.g., to enable compatibility with one-time password(s), to name one non-limiting example), while making minimal to no changes with respect to how the application interacts with the end-user.

One aspect of the present disclosure relates to a system configured for controlling user access to an application. The system may include one or more hardware processors configured by machine-readable instructions. The processor(s) may be configured to request to access the application. The application may be associated with an identity provider and a datastore. The processor(s) may be configured to route the request to an intermediary prior to receipt by the application. The intermediary may redirect the request to the identity provider for authentication. The authentication may include receiving application identity information (e.g., username, password, multi-factor authentication or MFA information, biometrics information, to name a few non-limiting examples) at the identity provider from the user. The authentication may include authenticating the user with the application based at least in part on the application identity information. The one or more hardware processors may be further configured to receive user authentication confirmation at the intermediary. The one or more hardware processors may be further configured to generate at the intermediary a temporary user credential associated with the application. The one or more hardware processors may be further configured to transmit the temporary user credential to the data store. The one or more hardware processors may be further configured to save the temporary user credential at the data store. The one or more hardware processors may be further configured to provide the request to access the application and the temporary user credential from the intermediary to the application. The one or more hardware processors may be further configured to send the temporary user credential from the application to the datastore. The one or more hardware processors may be further configured to send confirmation from the datastore to the application that the temporary user credential enables user access to the application. The one or more hardware processors may be further configured to, in response to the request to access the application from the user, send a communication from the application to the user granting the user access to the application.

In some implementations of the system, requesting to access the application may include a plurality of separate requests to access the application. In some implementations of the system, generating at the intermediary a temporary user credential may include generating a temporary user credential for each of the plurality of separate requests to access the application.

In some implementations of the system, the datastore may include legacy user credentials. In some implementations of the system, saving the temporary user credential at the data store may include replacing the legacy user credentials with the temporary user credential. In some implementations of the system, sending the temporary credential from the application to the datastore may include utilizing an application algorithm to verify the temporary user credential against the datastore.

In some implementations of the system, the datastore may include a legacy identity and access management (IAM) system datastore associated with the application.

In some implementations of the system, saving the temporary user credential at the datastore may comprise (1) providing the intermediary with read/write datastore access, wherein the read/write datastore access may be provided from the application prior to saving the temporary user credential at the datastore, (2) using the application identity information to access user information at the datastore, and/or (3) replacing at least a portion of the application identity information with the temporary user credential at the datastore.

In some implementations of the system, the datastore may include one of a MySQL datastore and a lightweight directory access protocol (LDAP) datastore.

In some implementations of the system, sending the temporary user credential from the application to the datastore may include intercepting the sending by the intermediary. In some implementations of the system, sending confirmation from the datastore to the application that the temporary user credential may enable user access to the application includes sending the confirmation from the intermediary to the application.

Another aspect of the present disclosure relates to a method for controlling user access to an application. The method may include requesting to access the application. The application may be associated with an identity provider and a datastore. The method may include routing the request to an intermediary prior to receipt by the application. In some examples of the method, the intermediary may redirect the request to the identity provider for authentication. In some examples, the authentication may include receiving application identity information at the identity provider from the user, wherein the authentication may include authenticating the user with the application based at least in part on the application identity information. The method may further include receiving user authentication confirmation at the intermediary; generating at the intermediary a temporary user credential associated with the application; transmitting the temporary user credential to the data store; saving the temporary user credential at the data store. The method may also include providing the request to access the application and the temporary credential from the intermediary to the application; sending the temporary credential from the application to the datastore; sending confirmation from the datastore to the application that the temporary credential enables user access to the application. In some examples, in response to the request to access the application from the user, the method includes sending a communication from the application to the user granting the user access to the application.

In some implementations of the method, requesting to access the application may include a plurality of separate requests to access the application. In some implementations of the method, generating at the intermediary a temporary user credential may include generating a temporary user credential for each of the plurality of separate requests to access the application.

In some implementations of the method, the datastore may include legacy user credentials. In some implementations of the method, saving the temporary user credential at the data store may include replacing the legacy user credentials with the temporary user credential. In some implementations of the method, sending the temporary user credential from the application to the datastore may include utilizing an application algorithm to verify the temporary user credential against the datastore.

In some implementations of the method, the datastore may include a legacy identity and access management (IAM) system datastore associated with the application.

In some implementations of the method, saving the temporary user credential at the datastore may include one or more of providing the intermediary with read/write datastore access, where the read/write datastore access may be provided from the application prior to saving the temporary user credential at the datastore, using the application identity information to access user information at the datastore, and replacing at least a portion of the application identity information with the temporary user credential at the datastore.

In some implementations of the method, the datastore may include one of a MySQL and an LDAP datastore.

In some implementations of the method, sending the temporary user credential from the application to the datastore may include intercepting the sending by the intermediary. In some implementations of the method, sending confirmation from the datastore to the application that the temporary user credential may enable user access to the application includes sending the confirmation from the intermediary to the application.

Yet another aspect of the present disclosure relates to a non-transient computer-readable storage medium having instructions embodied thereon, the instructions being executable by one or more processors to perform a method for controlling user access to an application. The method may include routing the request to an intermediary prior to receipt by the application. In some examples of the method, the intermediary may redirect the request to the identity provider for authentication. In some examples, the authentication may include receiving application identity information at the identity provider from the user, wherein the authentication may include authenticating the user with the application based at least in part on the application identity information. The method may further include receiving user authentication confirmation at the intermediary; generating at the intermediary a temporary user credential associated with the application; transmitting the temporary user credential to the data store; saving the temporary user credential at the data store. The method may also include providing the request to access the application and the temporary credential from the intermediary to the application; sending the temporary credential from the application to the datastore; sending confirmation from the datastore to the application that the temporary credential enables user access to the application. In some examples, in response to the request to access the application from the user, the method includes sending a communication from the application to the user granting the user access to the application.

In some implementations of the computer-readable storage medium, requesting to access the application may include a plurality of separate requests to access the application. In some implementations of the computer-readable storage medium, generating at the intermediary a temporary user credential may include generating a temporary user credential for each of the plurality of separate requests to access the application.

In some implementations of the computer-readable storage medium, the datastore may include legacy user credentials. In some implementations of the computer-readable storage medium, saving the temporary user credential at the data store may include replacing the legacy user credentials with the temporary user credential. In some implementations of the computer-readable storage medium, sending the temporary user credential from the application to the datastore may include utilizing an application algorithm to verify the temporary user credential against the datastore.

In some implementations of the computer-readable storage medium, the datastore may include a legacy identity and access management (IAM) system datastore associated with the application.

In some implementations of the computer-readable storage medium, saving the temporary user credential at the datastore may include one or more of providing the intermediary with read/write datastore access, where the read/write datastore access may be provided from the application prior to saving the temporary user credential at the datastore, using the application identity information to access user information at the datastore, and replacing at least a portion of the application identity information with the temporary user credential at the datastore.

In some implementations of the computer-readable storage medium, the datastore may include one of a MySQL datastore and an LDAP datastore.

One aspect of the present disclosure relates to a system configured for controlling user access to an application. The system may include one or more hardware processors configured by machine-readable instructions. The processor(s) may be configured to request to access the application. The application may be associated with an identity provider and a datastore. The processor(s) may be configured to route the request to an intermediary prior to receipt by the application. The intermediary may redirect the request to the identity provider for authentication. The authentication may include receiving application identity information (e.g., username, password, multi-factor authentication or MFA information, to name a few non-limiting examples) at the identity provider from the user. The authentication may further include authenticating the user with the application based at least in part on the application identity information. The one or more hardware processors may be further configured to receive user authentication confirmation at the intermediary; generate at the intermediary a temporary user credential associated with the application; capture, at the intermediary, a backchannel request from the application to the data store, wherein the backchannel request includes the temporary user credential; confirm, at the intermediary, that the temporary user credential provided in the backchannel request matches the temporary user credential generated previously; send confirmation from the intermediary to the application that the temporary user credential enables user access to the application; and in response to the request to access the application from the user, sending a communication from the application to the user granting the user access to the application.

Another aspect of the present disclosure relates to a method for controlling user access to an application. The method may include requesting to access the application. The application may be associated with an identity provider and a datastore. The method may include routing the request to an intermediary prior to receipt by the application. In some examples of the method, the intermediary may redirect the request to the identity provider for authentication. In some examples, the authentication may include receiving application identity information at the identity provider from the user, wherein the authentication may include authenticating the user with the application based at least in part on the application identity information. Further, the method may include receiving user authentication confirmation at the intermediary; generating at the intermediary a temporary user credential associated with the application; providing the request to access the application with the temporary user credential from the intermediary to the application; capturing, at the intermediary, a backchannel request from the application to the data store, wherein the backchannel request includes at least the temporary user credential; confirming, at the intermediary, that the temporary user credential provided in the backchannel request matches the temporary user credential generated previously; sending confirmation from the intermediary to the application that the temporary user credential enables user access to the application; and in response to the request to access the application from the user, sending a communication from the application to the user granting the user access to the application.

Yet another aspect of the present disclosure relates to a non-transient computer-readable storage medium having instructions embodied thereon, the instructions being executable by one or more processors to perform a method for controlling user access to an application. The method may include routing the request to an intermediary prior to receipt by the application. In some examples of the method, the intermediary may redirect the request to the identity provider for authentication. In some examples, the authentication may include receiving application identity information at the identity provider from the user, wherein the authentication may include authenticating the user with the application based at least in part on the application identity information. Further, the method may include receiving user authentication confirmation at the intermediary; generating at the intermediary a temporary user credential associated with the application; providing the request to access the application with the temporary user credential from the intermediary to the application; capturing, at the intermediary, a backchannel request from the application to the data store, wherein the backchannel request includes the temporary user credential; confirming, at the intermediary, that the temporary user credential provided in the backchannel request matches the temporary user credential generated previously; sending confirmation from the intermediary to the application that the temporary user credential enables user access to the application; and in response to the request to access the application from the user, sending a communication from the application to the user granting the user access to the application.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
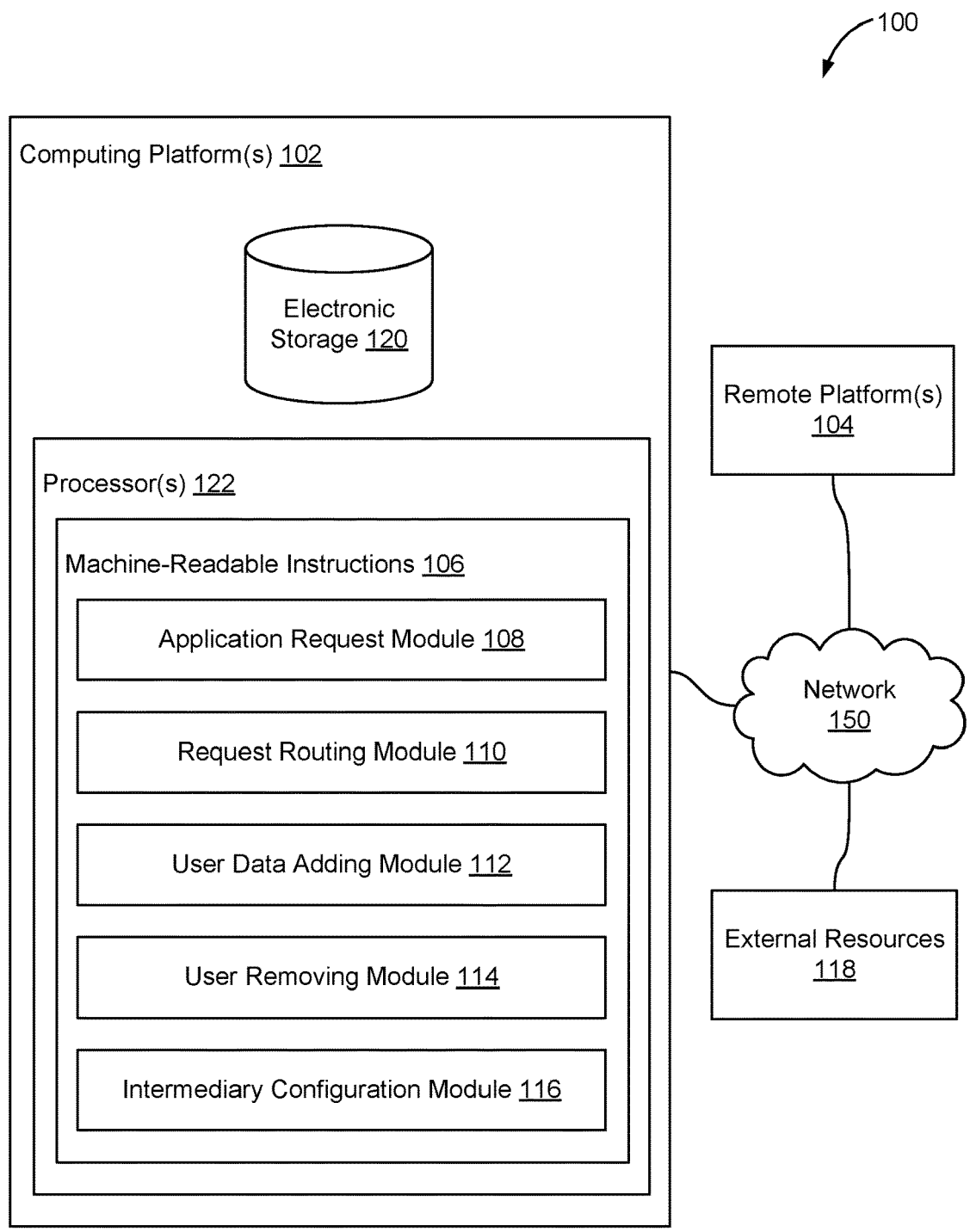
FIG. 1 illustrates a system configured for controlling user access to an application, in accordance with various aspects of the disclosure.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

The words "for example" is used herein to mean "serving as an example, instant, or illustration." Any embodiment described herein as "for example" or any related term is not necessarily to be construed as preferred or advantageous over other embodiments. Additionally, a reference to a "device" is not meant to be limiting to a single such device. It is contemplated that numerous devices may comprise a single "device" as described herein.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are often described in terms, such as comparing, sorting, selecting, or adding, which are commonly associated with mental operations performed by a human operator. It should be understood that these terms are employed to provide a clear description of an embodiment of the present invention, and no such human operator is necessary, nor desirable.

This requirement for machine implementation for the practical application of the algorithms is understood by those persons of skill in this art as not a duplication of human thought, rather as significantly more than such human capability. Useful machines for performing the operations of one or more embodiments of the present invention include general purpose digital computers or other similar devices. In all cases the distinction between the method operations in operating a computer and the method of computation itself should be recognized. One or more embodiments of the present disclosure relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, where some aspects of the algorithm may be performed by the circuitry itself rather than a result of an instruction.

Some embodiments of the present disclosure rely on an apparatus for performing one or more of the disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context.

In the description of embodiments herein, frequent use is made of the terms server, client, and client/server architecture. In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that client and server each perform distinct, but complementary functions to accomplish a task or provide a service. The client and server accomplish this by exchanging data (e.g., in data flows), messages, and often state information using a computer network, or multiple networks. It should be appreciated that in a client/server architecture for distributed computing, there are typically multiple servers and multiple clients, and they do not map to each other and further there may be more servers than clients or more clients than servers. A server is typically designed to interact with multiple clients. In some embodiments, a client computer (or simply, client) may be implemented using a user device or user equipment (UE), one non-limiting example of which includes UE 405-*a* in FIG. 4A. While UE 405 (e.g., UE 405-*a*, UE 405-*b*) are depicted as smartphones, this is not intended to be limiting. Other types of UEs known or contemplated in the art may be utilized in different embodiments. Some non-limiting examples of UEs (or clients) may include one or more of a laptop, a desktop computer, a tablet computer, and/or a NetBook. Furthermore, the UEs discussed herein may utilize any type of operating system (OS) and/or may support different types of communication technologies (e.g., wired or wireless communication technologies).

In networks, bi-directional data communication (i.e., data flows or traffic) may occur through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

Definitions and Terminology Used in the Disclosure

For the purposes of this disclosure, identity data may refer to individual users' data, including their credentials and attributes. For instance, identity data may include one or more of a user identity (e.g., first and/or last name of a user), a user credential (e.g., username, password, password authentication token, etc., that are bound to the user), and a user attribute (e.g., email address, phone number, residential address, job title, department, employee ID, etc.) for each of one or more individual users of one or more identity domains or identity providers (e.g., identity provider 415-*a* in FIG. 4A, identity provider 415-*b* in FIG. 4B, identity provider 515 in FIG. 5).

An identity session (also referred to herein as a "session") may refer to an established set of identity data (e.g., identity data accepted by the identity infrastructure to access a resource, such as an application) that represents a user interacting with the identity infrastructure. In some cases, an identity session may be established by authenticating a user (e.g., by a user proving their identity through a mechanism such as username and password and/or biometrics, such as fingerprint, iris scan, voice recognition, etc.) and maintaining this session state (e.g., authenticated state) for some established period of time or until the user logs out or their access rights are otherwise suspended. In some cases, an identity session may refer to a logical construct, for instance, based on a user's identity, that establishes persistence across resource access (e.g., file access, app access) and/or page views (e.g., HTTP pages). It is contemplated that a "resource" may also refer to "page views". For example, HTTP is a stateless protocol, which means that when a user requests a particular webpage or resource from a server, and subsequently requests another webpage or resource from the same server, the server treats the user as a new "requestor" each time. In some examples, a session state refers to a feature that allows an identity domain or provider (e.g., shown as identity provider 415-*a* in FIG. 4A) to remember the user by keeping a temporary record of identity data associated with the user. In some cases, each identity session may be assigned a unique identifier (or session ID) and this session ID may be used to store and retrieve a session state (or an application's working set of data) before and after each page view (e.g., HTTP page view). The application's working set of data may refer to information associated with one or more page views (e.g., items in a shopping cart for an online shopping or e-commerce website). In some cases, the information associated with the session, such as the session ID, may be stored on the server from which the user is requesting the webpage or resource. Additionally, or alternatively, the session ID may be stored on a different computing device such as a user device (e.g., laptop, smartphone, etc.) from which the user is accessing the resource. In some cases, an identity session may be established by authenticating a user and maintaining a session state for at least a threshold or an established period of time (e.g., 1 minute, 30 seconds, 5 minutes, etc.). In some cases, an identity session may also constitute a set of permissions granted to the user (e.g., for accessing resources, such as protected resources accessible to only certain users, in the identity infrastructure) and/or role information associated with the user. In some embodiments, the role information may be different from the user attribute. For instance, multiple users may be associated with the same or similar role information but may have different user attributes. In one example, users having similar designations or seniority levels in an organization (e.g., managers, managing directors, staff engineers, etc.) may be associated with the same or similar role information.

Identity metadata may be used herein to refer to information pertaining to how identity is managed and coordinated. Identity metadata may include password rules, such as, but not limited to password length or a requirement that the password must contain one capital letter, one number, one symbol and/or cannot be the same as a previous password. Identity metadata may also include authorization policies, such as, but not limited to a policy which states that user must be in the administrator group to access a resource, a user must be logged in from a US-based IP address, and/or a user may only access resources during business hours (e.g., 9 AM to 5 PM). Additionally, or alternatively, identity metadata may also include a trust policy and network locations for identity domain elements of one or more identity domains (i.e., identity providers). The identity metadata may further include one or more of: the enumeration of identity infrastructure elements and their network location and configuration, identity policies such as authorization or authentication rules and mechanisms, and identity session structure and content.

In some examples, identity sessions may comprise timestamps for when a session was initiated, the maximum lifetime of a session, how long a session should last for an idle user, an opaque user identifier (e.g., a type of user identifier that does not reveal the user's identity and may comprise a random string or number), a reference to a session identifier (potentially optional, e.g., if maintained centrally), a reference to a requested resource, one or more claims about the user (which may comprise identity attributes), one or more "scopes", and/or an enumeration of privileges the user has for the requested resource. In some examples, sessions may be maintained in browser cookies, JSON Objects that are passed between different endpoints, server caches, or databases. In some cases, scopes may be used to define the specific actions that are permitted to be performed on behalf of a user, an application, etc. When a user agent (e.g., web browser) requests permission to access a protected resource or application through an authorization server, a scope parameter may be provided to specify what access is needed and the authorization server may use the scope parameter to respond with the access that is actually granted (e.g., the granted access may be different from what was requested). In some examples, this process may comprise the authorization server (e.g., access system 523) generating an access token comprising one or more scopes based on evaluating the user authentication data and/or scope parameters. In some cases, the access token comprises a string of random characters that enables the protected resource (e.g., application or app 425-*a*, app 525) to verify incoming requests may be granted access to the protected resource. For instance, the access token may be based in part on the username/password credentials received from the user during login. In some cases, the access token serves as a key comprising a collection of metadata (e.g., information pertaining to an authorization policy for the user).

An identity domain (or identity provider, such as identity provider 415-*a*) refers to a computing system for managing one or more of users and roles, integration standards, external identities (e.g., identities not associated with the identity domain), and secure application integration using, for instance, an authentication scheme (e.g., Single Sign-On (SSO)) and/or an authorization protocol (e.g., a set of rules that allows a third-party website or application to access a user's data without the user needing to share login credentials). Application integration, as used herein, refers to a mechanism for supporting interactions between an application or protected resource associated with a first identity domain and users associated with a second different identity domain. As an example, an enterprise may have developed an app for its customer or enterprise partner, where the app may be secured by a first identity domain. Further, the enterprise partner may already manage one or more identities on other identity domains, such as a second identity domain. In such cases, the enterprise may integrate their app with the second identity domain, which may allow users associated with the second identity domain to seamlessly interact with their app without creating another identity (e.g., in the first identity domain) to access the app. In another case, an enterprise may migrate users from a legacy identity domain/provider to a new identity domain/provider, while still keeping the legacy identity domain/provider for controlling access to an application. In such cases, users attempting to access the application may login with the new identity domain/provider, following which an orchestrator (e.g., an intermediary or proxy) may update a datastore associated with the legacy identity domain/provider and utilized by the app to grant or deny access to its resources, further described below in relation to FIGS. 1-5.

In some cases, integration of identities and applications may be performed using one of numerous methods, such as manual identity administration (e.g., manually adding users from the second identity domain into the first identity domain), utilizing existing identity solutions (e.g., allowing users to sign in using their Google or Microsoft credentials, provided by Alphabet, Inc., of Mountain View, CA, and Microsoft Corp., of Redmond, WA, respectively), and/or federation (e.g., enterprise and customer/enterprise partner mutually agree to allow the enterprise partner users to use their own identities to access the app provided by the enterprise). In some cases, identity federation may comprise enforcing common identity standards and protocols to coordinate and manage user identities between different identity providers or identity domains, applications, etc., across an identity infrastructure.

There exist numerous identity and access management (IAM) standards (also referred to as integration standards) for managing access. In some cases, these IAM standards are "open" standards, that is, they are publicly available and associated with one or more rights to use. In some cases, these IAM standards are integrated (e.g., unified) and used across a plurality of applications, devices, and/or users. Some non-limiting examples of IAM standards include Security Assertion Markup Language (SAML) used to send authorization messages between trusted partners or entities, OpenID, Web Services Trust (WS-Trust), WS-Federation, and OAuth. SAML defines an XML framework for exchanging security assertions among security authorities and may facilitate interoperability across different vendor platforms that provide authentication and/or authorization services. In some circumstances, Oauth may enable a user's account information to be used by third-party services, such as Facebook provided by Facebook, Inc., of Menlo Park, CA, without exposing the user's password. In some examples, an identity domain (or identity provider) controls the authentication and authorization of the users who can sign into a service (e.g., a cloud service), and what features they can access in relation to the service. For example, a cloud service (e.g., Database Cloud Service and Infrastructure as a Service (IaaS)) may be associated with an identity domain. Multiple services may be associated with a single identity domain or provider to share user definitions and authentication rules, for instance. In some cases, users associated with an identity domain may be granted different levels of access (or authorization) to each service (e.g., cloud service) associated with the identity domain. For instance, a first user (e.g., a system administrator) may be provided both read and write access, while another user (e.g., accountant) may only be provided read access. Thus, in some aspects, an identity domain or provider is a self-contained realm with consistent identity data and identity metadata throughout. Some non-limiting examples of an identity domain include an Active Directory (AD) domain or an Okta account for a single company. It should be noted that other identity domains known in the art may be contemplated in different embodiments.

A trust relationship refers to a logical link established between two entities (e.g., a user and an identity domain, two identity domains, etc.), where one of the entities may be referred to as a trusting domain (e.g., a first identity domain) while the other may be referred to as a trusted domain (e.g., a second identity domain). When a trust relationship is in place, the trusting domain may honor, for instance, a login authentication associated with the trusted domain. In some circumstances, trust relationships may be necessary for identity sessions to be accepted by the protected resource (e.g., application). Trust relationships may be a way to establish the validity of identity sessions and prevent spoofing of an identity session. In some cases, trust relationships may be established via a signature generated from a private key and validated using an associated public key.

Public key cryptography (also known as asymmetric cryptography) refers to an encryption technique where two parties (e.g., a user and an identity domain/provider, a user and a protected resource) may each be assigned two keys—a public key and a private key. Numerous cryptographic tools and modules exist for generating public/private key pairs. One non-limiting example of such a tool is OpenSSL provided by TheOpenSSL Project. OpenSSL is an open-source command line tool that is used for TLS and Secure Socket Layer (SSL) protocols and may be used to generate public/private keys, install SSL/TLS certificates, and identity certificate information. Other types of commercial and/ or open-source tools for generating public and private keys are contemplated in different embodiments. In some cases, the two keys for a respective party may be connected and may comprise two large prime numbers (e.g., 100 digits long, 150 digits long, etc.) with certain mathematical properties. For instance, two random n-bit (e.g., 512-bit, 1024-bit, etc.) prime numbers may be generated and multiplied together to create a modulus (N), where the value N is part of the public and private key. The public key may be shareable and may allow a receiving entity to receive messages from other entities. Further, the receiving entity may decrypt the message or dataflow using their private key.

In such cases, a receiving entity may decode a message or dataflow encoded by a transmitting entity (i.e., using the receiving entity's public key) by using their private key (i.e., the receiving entity's private key). In some cases, a user may be authenticated using their login credentials and a trusted third party (e.g., a Certification Authority (CA)) may prove a link between the public key of the user and the user's identity. For instance, the CA may be associated with a public key and a private key and may sign a certificate using their private key. The identity domain or protected resource may use the public key associated with the CA to determine the user's public key (e.g., embedded within the certificate) and verify the user (i.e., confirm the user's identity by verifying who they say they are). In some cases, any entity (e.g., protected resource, another user, etc.) with the public key associated with the CA may decrypt the certificate to identify the user's public key.

In some cases, public/private key pairs may also be used to decrypt and verify assertions between different identity domain and/or identity infrastructure elements. Each receiving entity possessing a public key associated with a transmitting entity may be able to read (e.g., decrypt) a message that has been signed using a corresponding private key of the transmitting entity and confirm that the original contents of the message have not been altered, for instance. Or, in one non-limiting example, an identity domain element may use its private key to sign a cookie associated with an identity session. In such cases, one or more protected resources or applications that trust and rely on the cookie to grant user access to the protected resource may utilize the public key in the identity session to decrypt and verify the signature, thereby enabling access to the protected resource.

In other cases, trust relationships may involve Transport Layer Security (TLS) combined with a Domain Name System (DNS) to confirm that traffic is routed to the expected element and not subject to interception by a rogue party (e.g., Man-in-the-middle attack). As an example, two servers may connect together over a network and communicate with each other, where their communications may be secured using TLS. In some cases, TLS may involve the use of a specific protocol to enable the servers to establish their identity with each other. Similarly, communication(s) between an identity domain/provider, protected resource, etc., may be secured using TLS. In some cases, a DNS routing a request to a host (e.g., a first server) may issue a certificate to the requesting party (e.g., a second server, a user agent, etc.) to prove that the DNS routed the request to the correct host. In some cases, the certificate may be signed using a private key associated with the DNS and may comprise a public key associated with the host server. The requesting party may decrypt the certificate (e.g., using the public key associated with the DNS) and retrieve the public key of the host embedded within the certificate, which may allow the requesting party to confirm that the request was routed to the expected element. In other cases, the host server may issue a certificate and sign it using their private key. The DNS or the host may further relay the certificate to the requesting party. After decryption, the requesting party may confirm the identity of the host that received their request.

Figure 4A:
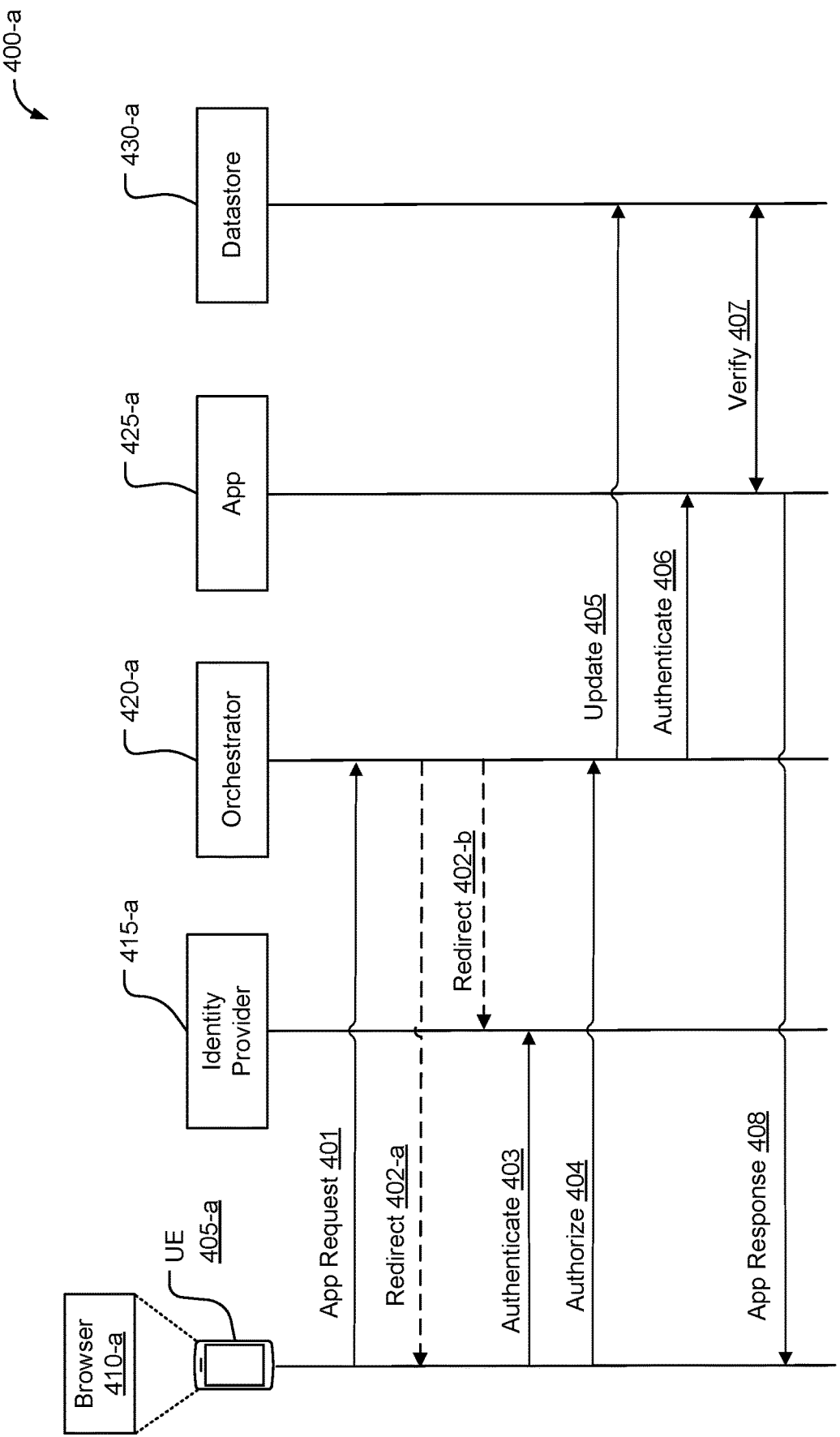
FIG. 4A illustrates a swim diagram representation of a method for controlling user access to an application, in accordance with various aspects of the disclosure.

In some examples, an intermediary (e.g., an orchestrating agent or orchestrator, such as orchestrator 420-*a* in FIG. 4A) may direct flow of identity data through the identity infrastructure. In some embodiments, orchestrating agents, such as orchestrators 420-*a* and 420-*b*, may be installed and placed as proxies within the flow of identity data (e.g., authentication and authorization requests, managing users, setting and reading user attributes) and identity metadata (e.g., setting, editing, and reading access policies, password rules, data locations, rules controlling user administration tasks and the hierarchy delegation of those tasks, rules for assigning user memberships in groups, roles, etc., and rules or policies to determine the assignment of accounts to users) of the existing system or identity infrastructure.

Lastly, a protected resource may refer to an element or application of the identity infrastructure that assesses or evaluates the identity data (e.g., information provided by a user to access the protected resource such as, but not limited to, a username, password, user attribute, unique identifier, unique pin, and biometric information such as, but not limited to a fingerprint, iris scan, and voice input, and other information known in the art) in order to make access and control decisions about its resources and/or data. One non-limiting example of a protected resource may include the application 425 (e.g., application 425-a and/or application 425-b). In other words, a protected resource may be aware about the identity data needed to access it. In some circumstances, the protected resource may use the identity session and/or the identity data in deciding to allow access to its data. In some embodiments, the protected resource may only allow restricted or partial access based on evaluating the identity data. As an example, a protected resource may expect a header or a cookie for access to the protected resource, while another protected resource may merely grant access upon a user arriving at that protected resource. Thus, each protected resource may be aware of the mechanism by which it may be provided an identity session by its associated identity domain. In some aspects, the protected resources are coupled to the identity domain based on their reliance on identity session(s) and their particular formats and security constraints (i.e., identity data and/or identity metadata formats and constraints).

In some cases, a header/cookie may be passed in a token, such as an authentication token or an access token. In some cases, the authentication token may be generated and assigned to a user once the user is authenticated (e.g., following authentication 403 in FIG. 4A). Further, a certificate (e.g., a Public Key Infrastructure (PKI) certificate, such as a Secure Socket Layer (SSL) certificate) linked to the authentication token and representing a valid identity session may be issued to the user. In some cases, the certificate may be issued by a third party, such as a Certification Authority (CA) and may include the user's public key, a name, and any other applicable information. The certificate may serve as an attestation by the CA that the user is who they claim to be. For instance, the CA may sign a data structure that contains the user's public key and name, thus binding the user's public key to their name. Further, the certificate may be encrypted by the CA. The CA may also be linked to a private key and a public key, and may encrypt the certificate with a combination of the public and private keys associated with the CA. Any entity (e.g., protected resource or app, another user, another identity domain, etc.) with access to the CA's public key may verify the certificate (i.e., that the certificate is issued by a trusted CA) and/or the claim made in the certificate (i.e., the user is associated with the user's public key). The user may utilize this certificate for interactions with the protected resource, for instance.

In some cases, authorization may comprise using attribute information associated with the token issued to the user during authentication and comparing said information to access control rules for the protected resource (e.g., app, such as app 425-a). If the rule permits the user to access the protected resource, the authorization is successful, and the user is granted access to the protected resource. In some other cases, access tokens may be utilized, for instance, if an identity domain/provider or protected resource does not support the use of certificates and authentication tokens. In such cases, an access token may be issued by a server, such as an authorization server (e.g., access system 523) once the user identity data, access control rules, etc., is verified. In other words, the access token may serve as a proof that the user is authorized for access. This access token may be sent in an authorization header, such as an HTTP authorization header, and may be used to establish user identity and authorization. In some cases, the protected resource (e.g., app 525) or identity domain/provider (e.g., identity provider 515) may validate the token, for instance, via a call to one or more of the authentication server (e.g., authenticate system 521) and authorization server (e.g., access system 523), or using a public key corresponding to a private key with which the authentication and/or authorization server signed the access token. Alternatively, in some circumstances, anyone (e.g., authorized user, rogue user) holding the access token may gain access to the protected resource. To alleviate such issues, communication of the access token may be secured via Transport Layer Security (TLS). Centralized validation of access tokens may also mitigate the chances of a rogue user gaining access to a protected resource (i.e., man in the middle attack). Some non-limiting examples of tokens (e.g., access tokens, authentication tokens) may comprise bearer tokens, hash-based authentication code (HMAC) tokens, and RSA-SHA1 tokens using RSA private/public keypairs. In some cases, a token may comprise one or more of unique string values, hashed values, a cryptographic hash function and a secret cryptographic key, attributes information, etc., issued by a server, such as an authentication server (e.g., authenticate system 521).

The identity infrastructure may include one or more identity domains (or identity providers) and one or more identity infrastructure elements. The one or more identity domains (e.g., identity domain or provider 515) may further comprise one or more identity domain elements, where the one or more identity domain elements may comprise hardware (e.g., servers, computing devices or platforms, etc.), software (e.g., a cloud service), or a combination thereof. For example, in FIG. 5, the identity provider 515 comprises an attributes system 526, an access system 523, an authenticate system 521, and app(s) 525. In some cases, the attributes system 526, the access system 523, and/or the authenticate system 521 may be embodied in hardware, software, or a combination thereof. By way of non-limiting example, the one or more identity infrastructure elements installed in the identity infrastructure may include one or more of servers, routers, datastores (e.g., datastore 430-a, datastore 430-b), identity stores comprising one or more databases of authentication information, policy enforcement points for enforcing authorization rules (e.g., shown as access system 523 in FIG. 5), authentication points for determining user identity (e.g., shown as authenticate system 521 in FIG. 5), proxy devices (e.g., an intermediary or orchestrator, such as orchestrator 520 in FIG. 5), policy decision points for evaluating authorization rules based at least in part on identity session attributes, and protected resources (e.g., applications or apps, such as app(s) 525).

In some examples, a policy decision point (PDP) is a system entity or component of a policy-based access control system that may make authorization decisions for itself or alternatively, for other system entities that request such decisions. For instance, a PDP may determine whether or not to authorize a user's request based on available information (e.g., attributes, such as identity session attributes) and/or applicable security policies. In some cases, a PDP may examine a request to access a resource (e.g., an application or app, such as a mobile app, web-based app, etc.) and compare said request to the policy that applies to requests for accessing that resource (i.e., to determine whether the requestor, such as a user, should be granted access). Additionally, or alternatively, the identity infrastructure may comprise at least one authorizing agent, also referred to as an enforcing agent, for interpreting identity session information and evaluating access rules. In other words, the authorizing or enforcing agent may enforce access control for protected resources, such as app(s) 525, in the identity infrastructure. In some embodiments, the identity session and identity data may be associated with the identity session information. Further, the authorizing or enforcing agents may be realized using hardware, firmware, software or a combination thereof.

In some cases, an identity provider (or identity domain) may refer to a construct for managing one or more of users and roles, integration standards, external identities, and secure application integration through single sign-on (SSO) configuration. In some aspects, an identity domain/provider, such as identity provider 515, may control the authentication and authorization of users who can sign into a service, and the features they can access in relation to the service. In some examples, the service may be a cloud service. In other cases, the service may be an on-premises service. In some circumstances, the identity infrastructure for an enterprise may comprise multiple identity domains/providers, and each identity domain may comprise multiple services. In other words, users of different identity domains/providers may be granted access to different services, applications, resources, etc., based on the services associated with each identity provider. Furthermore, users in an identity provider may also be granted different levels of access to each service associated with the identity provider. As used herein, the terms "identity domains", "identity providers", and "identity systems" may be used interchangeably throughout the disclosure.

In some cases, an enterprise or organization may utilize one or more identity providers, such as an on-premises identity provider and one or more cloud-based identity providers. In such cases, the enterprise may also need to manage identity (e.g., of their employees, their customers, etc.) in multiple locations (e.g., geographic locations, network locations, or a combination). Businesses are increasingly using multiple cloud services (e.g., Amazon Web Services (AWS) provided by Amazon, Inc., of Seattle, WA, Azure AD provided by Microsoft, Corp., of Redmond, WA, Google Cloud Platform (GCP) provided by Alphabet, Inc., of Mountain View, CA), each of which use unique, built-in identity systems. Further, a business or enterprise may wish to migrate applications and/or identity information to the cloud with minimal changes to the apps, how users interact with the apps, etc. For instance, an enterprise using a legacy identity system (e.g., not cloud based) may wish to migrate user accounts from the legacy identity system to the cloud-based identity system. However, the legacy identity system may be currently used to secure access to an application (e.g., an on-premises hosted application). According to aspects of this disclosure, an enterprise may migrate their user identities (or identity information) from the legacy identity system/provider to another identity system (e.g., cloud-based identity system), such that user access to the application is now provided by the other identity system, while at the same time minimizing user disruption and/or changes to user experience (i.e., how users interact with the application), as further described below. In some aspects, the present disclosure also helps minimize the cost, time, and/or resources associated with rewriting the application to ensure compatibility with the new identity system.

Turning now to FIG. 1, which illustrates an example of a system 100 configured for controlling user access to an application, in accordance with various aspects of the disclosure. In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104 (also referred to as client computing platform(s) 104). In some implementations, server(s) 102, client computing platform(s) 104, and/or external resources 118 may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

Computing platform(s) 102 may be configured by machine-readable instructions 106. Machine-readable instructions 106 may include one or more instruction modules. The instruction modules may include computer program modules. The instruction modules may include one or more of application request module 108, request routing module 110, user data adding module 112, user removing module 114, intermediary configuration module 116, and/or other instruction modules.

Figure 5:
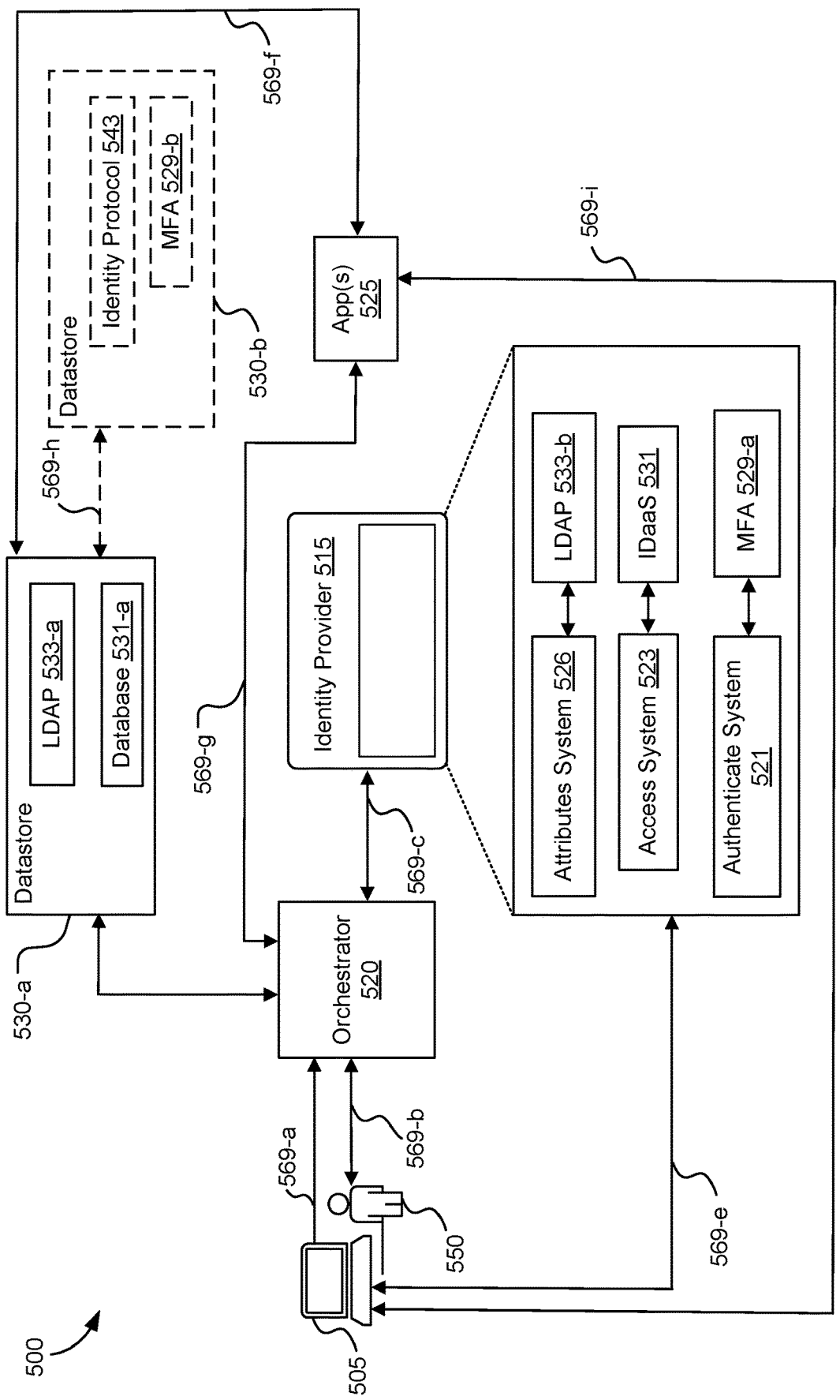
FIG. 5 illustrates a block diagram of a system configured for controlling user access to an application, in accordance with various aspects of the disclosure.

In some embodiments, application request module 108 may be configured to request to access the application. For instance, the application request module 108 may be configured to transmit a request (e.g., app request 401 in FIG. 4A) to access the application (e.g., app 425-a in FIG. 4A). The application may be associated with an identity provider (e.g., identity provider 415-a in FIG. 4A) and a datastore (e.g., datastore 430-a). The datastore may include or store user credentials, such as, but not limited to, legacy user credentials. The datastore, such as datastore 430-a, may include a legacy identity and access management (IAM) system datastore associated with the application. For example, FIG. 5 illustrates a datastore 530-a comprising a database 531-a, where the database 531-a may be similar or substantially similar to the legacy IAM system datastore described above and elsewhere in this disclosure. In some implementations, requesting to access the application may include a plurality of separate requests to access the application.

Request routing module 110 may be configured to route the request to an intermediary (e.g., orchestrator 420-a, orchestrator 420-b, and/or orchestrator 520) prior to receipt by the application (e.g., apps 425-a, 425-b, and/or 525). The intermediary may redirect the request to the identity provider (e.g., identity provider 415-a or identity provider 515) for authentication. In some cases, a temporary user credential may be generated at the intermediary. In some examples, generating the temporary user credential at the intermediary (i.e., orchestrator) may include generating a temporary user credential for each of the plurality of separate requests to access the application.

User data adding module 112 may be configured to add additional user data to the datastore (e.g., datastore 530-a). By way of non-limiting example, the additional user data may include at least one of a user first name, a user last name, a job title, a physical address, and an email address. Other types of user data may be added to the datastore, and the examples listed herein are not intended to be limiting. For example, additional user data may also include one or more of a unique identifier number (e.g., social security number or SSN, cellphone number, date of birth, date of birth appended with last 4 digits of SSN) specific to each user, an employee ID number (if applicable), an alternate email address and/or phone number, to name a few non-limiting examples. In some non-limiting examples, adding additional user data to the datastore, such as, but not limited to, datastore 530-a, may include providing additional user data from a second datastore (e.g., datastore 530-b) to the first datastore (i.e., datastore 530-a). By way of non-limiting example, the second datastore, such as, but not limited to, datastore 530-b, may include a datastore which one of, uses a standard identity protocol, and leverages multi-factor authentication or MFA. By way of non-limiting example, the standard identity protocol may include at least one of OpenID Connect (OIDC), Security Assertion Markup Language (SAML), and WebAuthn. Other types of standard identity protocols are contemplated in different embodiments, and the examples listed herein are not intended to limit the scope or spirit of this disclosure. In some cases, receiving application identity information at the identity provider from the user may include adding the user and one or more user attributes (e.g., email address, phone number, residential address, job title, department, employee ID, etc.) to the datastore. Some non-limiting examples of application identity information may also include a username, a password, and/or multi-factor authentication or MFA information. In some embodiments, the application identity information may also include biometric information and/or information for passwordless authentication, to name two non-limiting examples.

In some cases, the user data adding module 112 may be configured to save the temporary user credential at the datastore, such as datastore 530-a. Saving the temporary user credential at the datastore may include providing the intermediary (e.g., orchestrator 520) with read/write datastore access, where the read/write datastore access may be provided from the application (e.g., app 525) prior to saving the temporary user credential at the datastore. In some cases, saving the temporary user credential at the datastore may further comprise using the application identity information to access user information at the datastore, and replacing at least a portion of the application identity information (e.g., password) with the temporary user credential (e.g., one-time password or OTP) at the datastore. The datastore may include one of a MySQL datastore and a lightweight directory access protocol (LDAP) datastore, although other types of datastores are also contemplated in different embodiments. In some implementations, saving the temporary user credential at the data store may include replacing the legacy user credentials with the temporary user credential.

In some implementations, the temporary user credential may be sent from the application, such as app 525, to the datastore. In some cases, sending the temporary user credential from the application to the datastore may include utilizing an application algorithm to verify the temporary user credential against the datastore. That is, sending the temporary user credential from the app to the datastore may include at least verifying the temporary user credential against information stored in the datastore. Additionally, or alternatively, sending the temporary user credential from the application to the datastore may include intercepting the sending by the intermediary. For instance, in one non-limiting example, the intermediary (e.g., orchestrator 520) may intercept the sending of the temporary user credential from the application (e.g., app 525) to the datastore (e.g., datastore 530-a).

User removing module 114 may be configured to remove the user and the one or more user attributes (e.g., email address, phone number, residential address, job title, department, employee ID, etc.) from the datastore upon one of user logout of the application and expiration of a user session (or identity session) with the application.

Intermediary configuration module 116 may configure the intermediary as a proxy (e.g., Application Gateway proxy, or simply, AppGateway proxy) for the identity provider, for instance, before the intermediary (e.g., orchestrator 520) redirects the request (e.g., app request 569-a) to the identity provider (e.g., identity provider 515) for authentication. In some examples, the authentication may include receiving, at the identity provider, application identity information from the user. In some examples, the authentication may include authenticating the user with the application based at least in part on the application identity information. FIG. 5 shows an authenticate system 521-a at the identity provider 515, where the authenticate system 521-a may be utilized for authenticating the user 550 with the app(s) 525.

In some examples, the application request module 108, or another module at the intermediary, may be configured to receive user authentication confirmation. In some examples, the user data adding module 112 may be configured to generate, at the intermediary or orchestrator, a temporary user credential associated with the application and transmit the temporary user credential to the datastore. Further, the user data adding module 112 may be configured to save the temporary user credential at the datastore. In some cases, the request routing module 110 may be configured to provide the request to access the application to the application. Optionally, the request routing module 110 may be configured to also provide the temporary user credential from the intermediary to the application. In some examples, the application request module 108, or alternatively, the request routing module 110 may be configured to send the temporary user credential from the application to the datastore.

In some examples, the datastore, such as datastore 530-a, may be configured to inform the application that the temporary user credential enables user access to the application. In some embodiments, the application may send a communication to the user granting the user access to the application, i.e., in response to the request to access the application from the user. In some examples, sending confirmation from the datastore to the application that the temporary user credential enables user access to the application may include sending the confirmation from the intermediary (e.g., orchestrator 520) to the application. For example, the orchestrator 520 may send a confirmation (via dataflow 569-c) to the identity provider 515, or alternatively, to the app 525, that the temporary user credential enables user access to the app 525. Additionally, or alternatively, sending confirmation from the datastore (e.g., datastore 530-a) to the application (e.g., app 525) that the temporary user credential may enable user access to the application includes applying one or more authorization decisions to determine whether the user may access the application. For instance, applying the one or more authorization decisions may include applying one or more rules (e.g., only users with certain roles or designations should be allowed to access the application) as they relate to controlling access to the application. In this example, if the user does not meet the roles/designation criteria, the orchestrator 520 may decline to send confirmation for the temporary user credential.

In some cases, the datastore may include a plurality of user data associated with the application. By way of non-limiting example, the user data may include at least one of a user identifier, a user first name, a user last name, and information related to a unique identifier number specific to the user, such as, but not limited to, an employee identification number, a social security number (SSN), and/or a mobile number. The user data may include data for use with one of data customization and authorization decisions and across a target identity domain. Some non-limiting examples of the data for use with one of data customization and authorization decisions may include localization information, preferred language (e.g., English), and/or last login time (i.e., timestamp associated with most recent login). The datastore may include a first datastore (e.g., datastore 530-*a*) and adding additional user data to the datastore may comprise providing additional user data from a second datastore (e.g., datastore 530-*b*) to the first datastore.

In some embodiments, the system 100 (or any of its modules) may be configured to request to access the application. The system 100 may also be configured to route the request to an intermediary (e.g., orchestrator 420-*c*) prior to receipt by the application (e.g., app 425-*c*). In some examples, the intermediary redirects the request to the identity provider (e.g., identity provider 415-*c*) for authentication, wherein the authentication comprises (1) receiving application identity information at the identity provider from the user, and (2) authenticating the user with the application based at least in part on the application identity information. The system 100 may also be configured to exchange application identity information with the identity provider to authenticate the user with the identity provider and/or the application; receive user authentication confirmation at the intermediary or orchestrator; generate at the intermediary, such as orchestrator 420-*c*, a temporary user credential associated with the user and/or the application; provide the request to access the application with the temporary user credential from the intermediary (e.g., intermediary or orchestrator 420-*c*) to the application, such as app 425-*c*; capture, at the intermediary, a backchannel request from the application to a datastore (e.g., datastore 430-*a*); confirm, at the intermediary, that the temporary user credential (e.g., provided in the backchannel request from the application to the datastore) matches the previously generated temporary user credential; send a confirmation from the intermediary to the application that the temporary user credential enables user access to the application; and in response to the request to access the application from the user, send a communication from the application to the user granting the user access to the application.

In some implementations, computing platform(s) 102, remote platform(s) 104, and/or external resources 118 may be operatively linked via one or more electronic communication links. For example, such electronic communication links may be established, at least in part, via a network 150 such as the Internet and/or other networks. It will be appreciated that this is not intended to be limiting, and that the scope of this disclosure includes implementations in which computing platform(s) 102, remote platform(s) 104, and/or external resources 118 may be operatively linked via some other communication media.

A given remote platform 104 may include one or more processors configured to execute computer program modules. The computer program modules may be configured to enable an expert or user (e.g., user 550) associated with the given remote platform 104 to interface with system 100 and/or external resources 118, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, and/or other computing platforms.

External resources 118 may include sources of information outside of system 100, external entities participating with system 100, and/or other resources. In some implementations, some or all of the functionality attributed herein to external resources 118 may be provided by resources included in system 100.

Computing platform(s) 102 may include electronic storage 120, one or more processors 122, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 120 may comprise non-transitory storage media that electronically stores information. The electronic storage media of electronic storage 120 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from computing platform(s) 102, information received from remote platform(s) 104, and/or other information that enables computing platform(s) 102 to function as described herein.

Processor(s) 122 may be configured to provide information processing capabilities in computing platform(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units.

These processing units may be physically located within the same device, or processor(s) 122 may represent processing functionality of a plurality of devices operating in coordination. Processor(s) 122 may be configured to execute modules 108, 110, 112, 114, and/or 116, and/or other modules. Processor(s) 122 may be configured to execute modules 108, 110, 112, 114, and/or 116, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and/or 116 are illustrated in FIG. 1 as being implemented within a single processing unit, in implementations in which processor(s) 122 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As another example, processor(s) 122 may be configured to execute one or more additional modules that may perform some or all of the functionality attributed below to one of modules 108, 110, 112, 114, and/or 116.

FIGS. 2A, 2B, 2C, 2D, and 2E illustrate methods 200-*a*, 200-*b*, 200-*c*, 200-*d*, and 200-*e*, respectively, for controlling user access to an application, in accordance with various aspects of the disclosure. The operations of method(s) 200 presented below are intended to be illustrative. In some implementations, method(s) 200 may be accomplished with one or more additional operations not described, and/or without one or more of the operations discussed. Additionally, the order in which the operations of method(s) 200 are illustrated in FIGS. 2A, 2B, 2C, 2D, and/or 2E and described below is not intended to be limiting.

In some implementations, method(s) 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method(s) 200 in response to instructions stored electronically on an electronic storage medium. The one or more processing devices may include one or more devices configured through hardware, firmware, and/or software to be specifically designed for execution of one or more of the operations of method(s) 200.

Figure 2A:
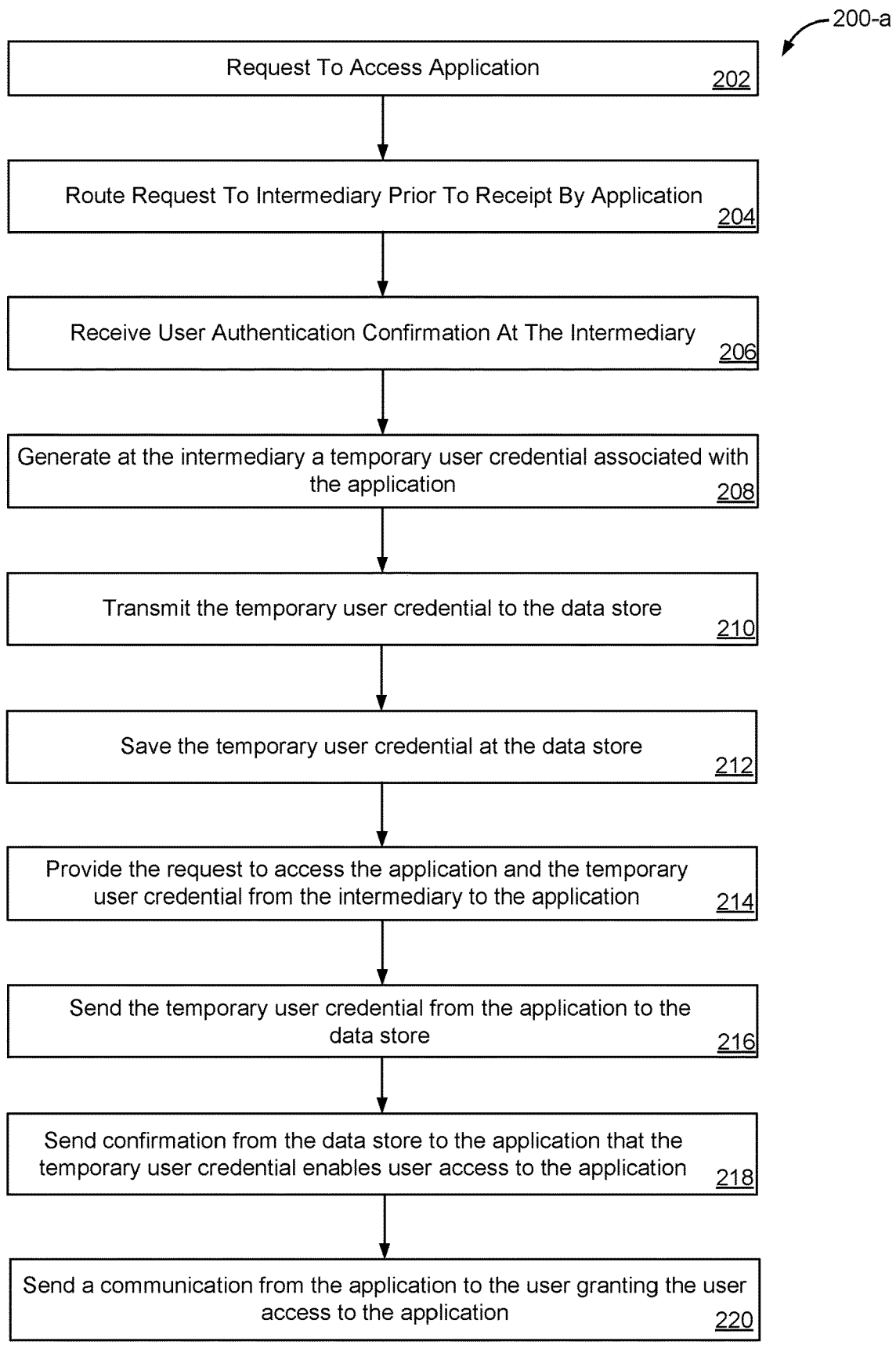
FIG. 2A illustrates a method for controlling user access to an application, in accordance with various aspects of the disclosure.

FIG. 2A illustrates an example of a method 200-*a* for controlling user access to an application, in accordance with various aspects of the disclosure.

A first operation 202 may include requesting to access the application (e.g., app 425-*a*, app 425-*b*, app 525). The application may be associated with an identity provider (e.g., identity provider 515) and a datastore (e.g., datastore 430-*a*, datastore 530-*a*). As seen in FIG. 4A, the orchestrator 420-*a* receives an app request 401 to access the app 425-*a*. First operation 202 may be performed by one or more hardware processors configured by machine-readable instructions including a module that is the same as or similar to application request module 108, in accordance with one or more implementations.

A second operation 204 may include routing the request to an intermediary (e.g., orchestrator 420-*a*) prior to receipt by the application (e.g., app 425-*a*). In some examples, the intermediary redirects the request to the identity provider (e.g., identity provider 415-*a*) for authentication, wherein the authentication comprises (1) receiving application identity information at the identity provider from the user, and (2) authenticating the user with the application based at least in part on the application identity information. For example, as seen in FIG. 4A, the orchestrator 420-*a* (i.e., the intermediary) redirects, via one or more of redirect 402-*a* and redirect 402-*b*, the app request to one or more of the UE 405-*a* and the identity provider 415-*a*, respectively. Furthermore, the UE 405-*a* exchanges application identity information with the identity provider 415-*a* to authenticate 403 the user (i.e., associated with UE 405-*a*) with the identity provider 415-*a* and/or the app 425-*a*. Second operation 204 may be performed by one or more hardware processors configured by machine-readable instructions including a module that is the same as or similar to request routing module 110, in accordance with one or more implementations.

A third operation 206 may include receiving user authentication confirmation at the intermediary. For example, in FIG. 4A, the orchestrator 420-*a* receives user authentication confirmation (via authorize 404) indicating that the UE 405-*a* is authorized to access the app 425-*a*. Third operation 206 may be performed by one or more hardware processors configured by machine-readable instructions including a module that is the same as or similar to application request module or user data adding module 114, in accordance with one or more implementations.

A fourth operation 208 may include generating at the intermediary, such as orchestrator 420-*a*, a temporary user credential associated with the application (e.g., app 425-*a*). Fourth operation 208 may be performed by one or more hardware processors configured by machine-readable instructions including a module that is the same as or similar to request routing module 110 or user data adding module 114, in accordance with one or more implementations.

A fifth operation 210 may comprise transmitting the temporary user credential to the data store, such as datastore 430-*a*. For instance, in FIG. 4A, the orchestrator 420-*a* generates a temporary user credential associated with the app 425-*a* and transmits the temporary user credential to the datastore 430-*a* in update 405. Fifth operation 210 may be performed by one or more hardware processors configured by machine-readable instructions including a module that is the same as or similar to user data adding module 114, in accordance with one or more implementations.

A sixth operation 212 may comprise saving the temporary user credential at the data store. For instance, in FIG. 4A, the temporary user credential received in update 405 is saved to the datastore 430-*a*. Sixth operation 212 may be performed by one or more hardware processors configured by machine-readable instructions including a module that is the same as or similar to user data adding module 114, in accordance with one or more implementations.

A seventh operation 214 may include providing the request to access the application and the temporary user credential from the intermediary to the application. For example, in FIG. 4A, the orchestrator 420-*a* provides the request to access the app 425-*a* and the temporary user credential (i.e., previously generated and transmitted to the datastore 430-*a* in update 405) to the app 425-*a* during authentication 406. Seventh operation 214 may be performed by one or more hardware processors configured by machine-readable instructions including a module that is the same as or similar to request routing module 110, in accordance with one or more implementations.

An eighth operation 216 may include sending the temporary user credential from the application to the datastore. For example, in FIG. 4A, the app 425-*a* and the datastore 430-*a* perform verification 407, where verification 407 comprises sending the temporary user credential from the app 425-*a* to the datastore 430-*a*. Eighth operation 214 may be performed by one or more hardware processors configured by machine-readable instructions including a module that is the same as or similar to the application request module 108 or the request routing module 110, in accordance with one or more implementations.

A ninth operation 218 may include sending confirmation from the datastore to the application that the temporary user credential enables user access to the application. For example, in FIG. 4A, the app 425-*a* and the datastore 430-*a* perform verification 407, where verification 407 comprises sending confirmation from the datastore 430-*a* to the app 425-*a* that the temporary user credential enables user access to the app 425-*a*. Ninth operation 214 may be performed by one or more hardware processors configured by machine-readable instructions including a module that is the same as or similar to the application request module 108 or the request routing module 110, in accordance with one or more implementations.

A tenth operation 220 may include, in response to the request to access the application from the user, sending a communication from the application to the user granting the user access to the application. For example, in FIG. 4A, following verification 407, the app 425-*a* transmits an app response 408 (i.e., a communication) to the UE 405-*a*, where the app response 408 grants user access to the app 425-*a*. Tenth operation 220 may be performed by one or more hardware processors configured by machine-readable instructions including a module that is the same as or similar to the application request module 108, in accordance with one or more implementations.

Figure 2B:
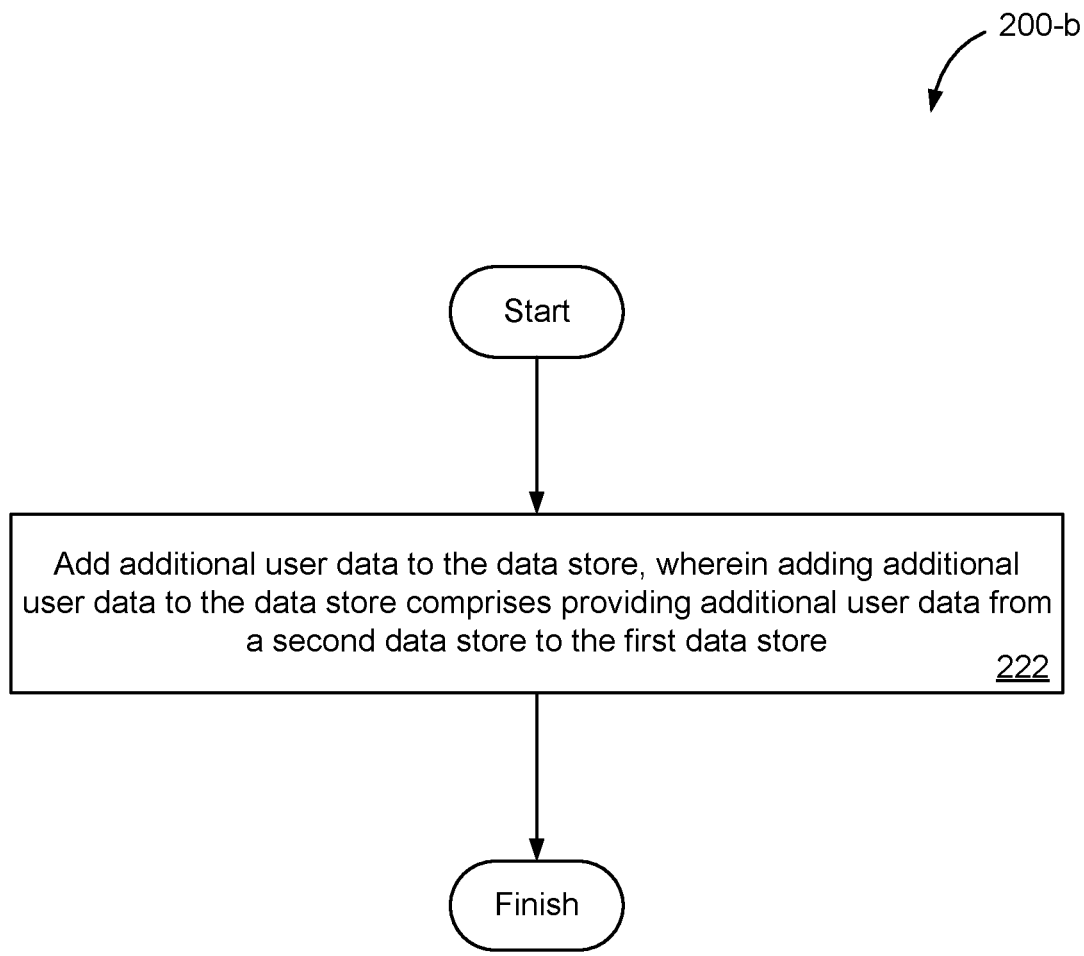
FIG. 2B illustrates another method for controlling user access to an application, in accordance with various aspects of the disclosure.

FIG. 2B illustrates an example of a method 200-*b* for controlling user access to an application, in accordance with various aspects of the disclosure.

A first operation 222 may include adding additional user data to the datastore (e.g., a first data store, such as datastore 530-*a* in FIG. 5), where adding additional user data to the data store comprises providing additional user data from a second data store (e.g., datastore 530-*b*) to the first data store. First operation 222 may be performed by one or more hardware processors configured by machine-readable instructions including a module that is the same as or similar to user data adding module 112, in accordance with one or more implementations.

Figure 2C:
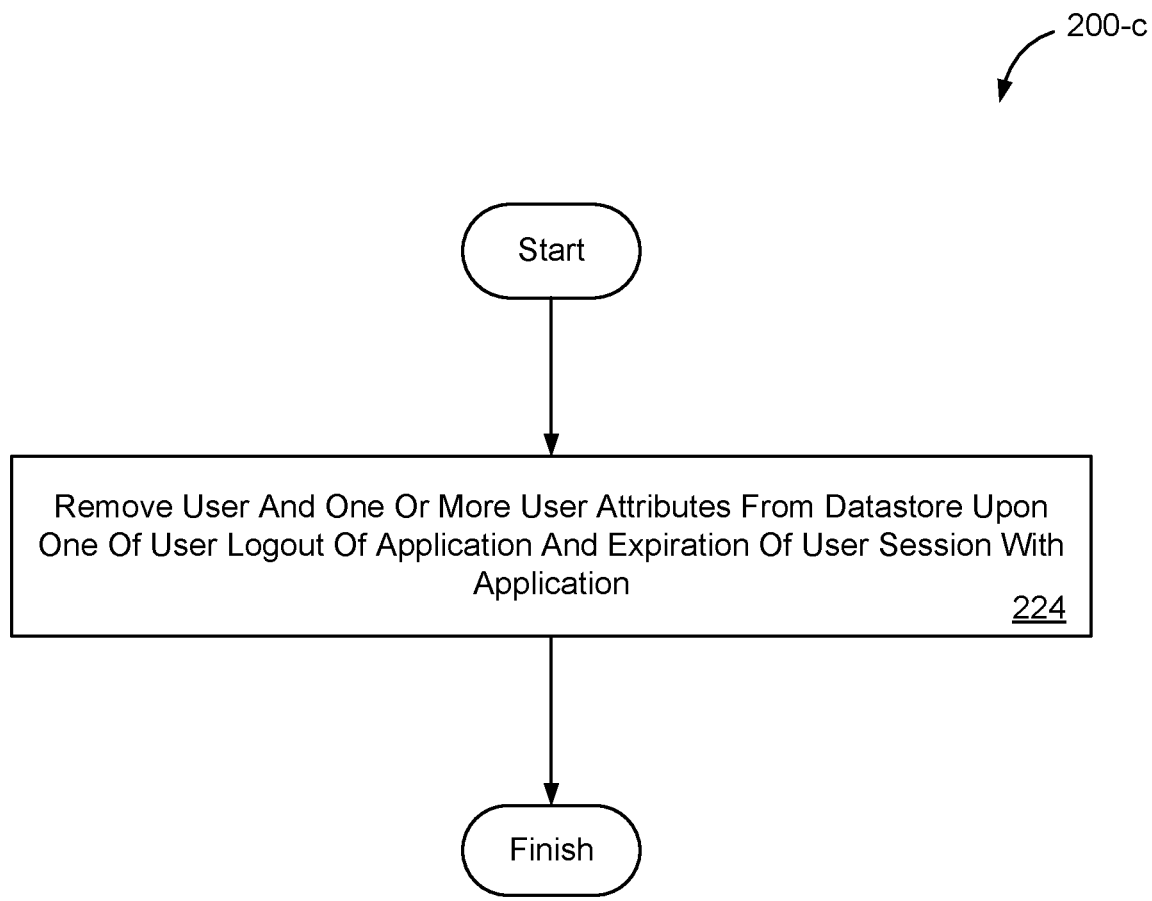
FIG. 2C illustrates another method for controlling user access to an application, in accordance with various aspects of the disclosure.

FIG. 2C illustrates an example of a method 200-*c* for controlling user access to an application, in accordance with various aspects of the disclosure.

A first operation 224 may include removing the user and the one or more user attributes (e.g., email address, phone number, residential address, job title, department, employee ID, etc.) from the datastore upon one of user logout of the application and expiration of a user session with the application. First operation 224 may be performed by one or more hardware processors configured by machine-readable instructions including a module that is the same as or similar to user removing module 114, in accordance with one or more implementations.

Figure 2D:
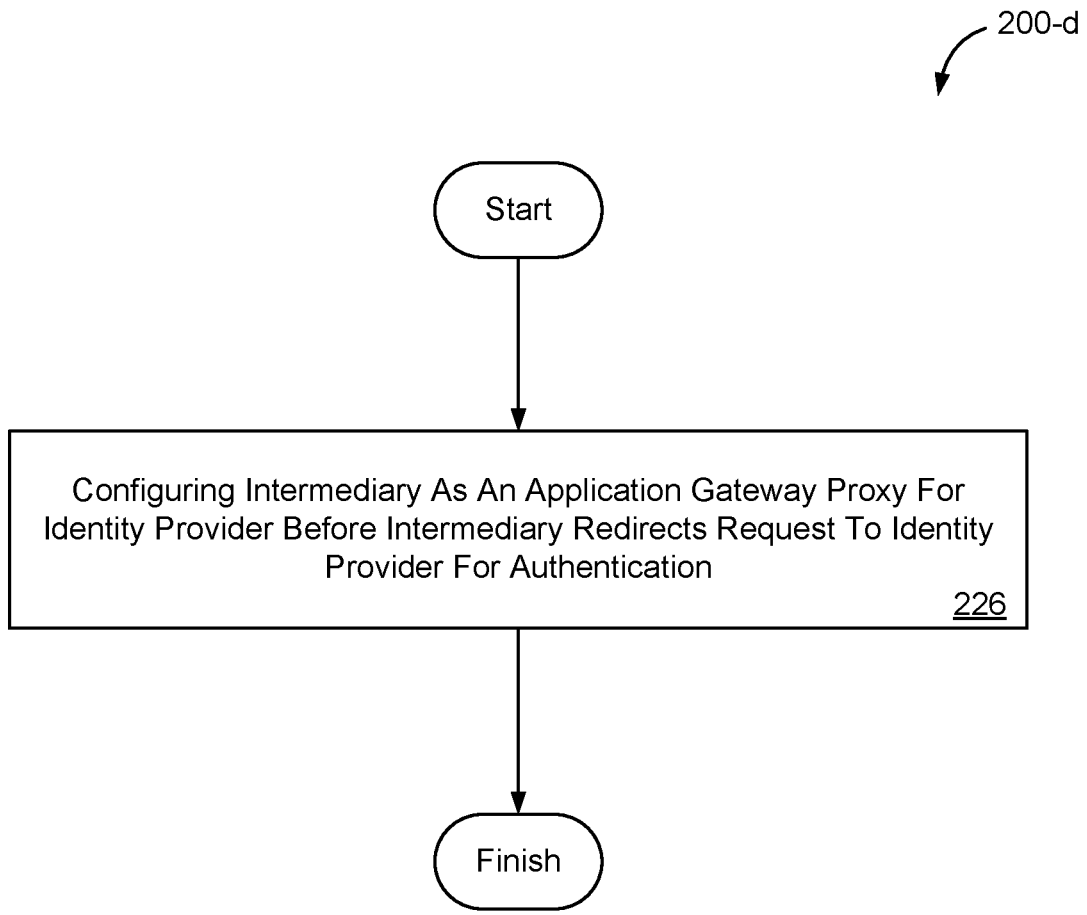
FIG. 2D illustrates another method for controlling user access to an application, in accordance with various aspects of the disclosure.

FIG. 2D illustrates an example of a method 200-*d* for controlling user access to an application, in accordance with various aspects of the disclosure.

A first operation 226 may include configuring the intermediary, such as orchestrator 420-*a*, as an Application Gateway (or AppGateway) proxy for the identity provider, for instance, before the intermediary redirects the request to the identity provider for authentication. First operation 226 may be performed by one or more hardware processors configured by machine-readable instructions including a module that is the same as or similar to intermediary configuration module 116, in accordance with one or more implementations.

Figure 2E:
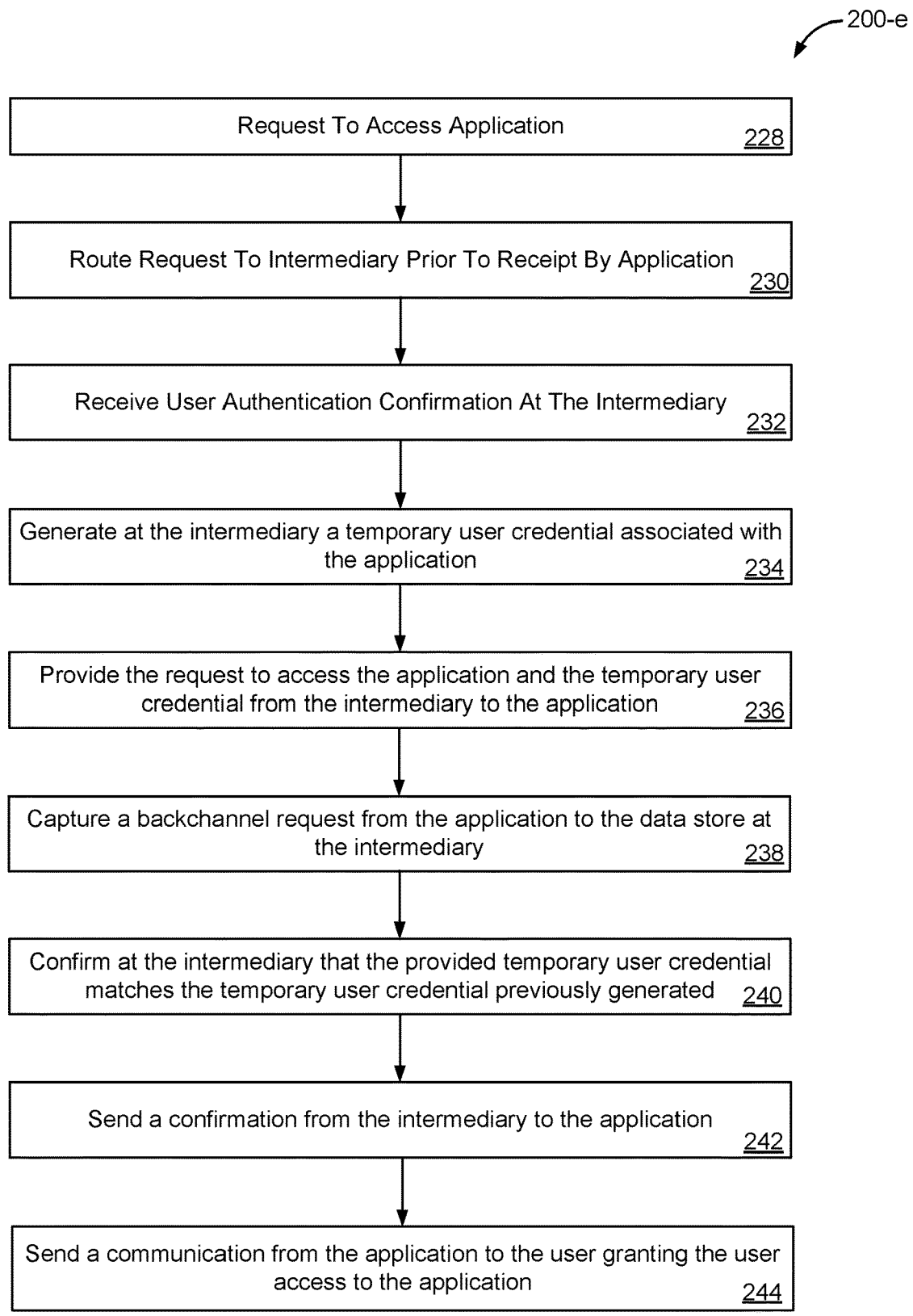
FIG. 2E illustrates another method for controlling user access to an application, in accordance with various aspects of the disclosure.

FIG. 2E illustrates an example of a method 200-*e* for controlling user access to an application, in accordance with various aspects of the disclosure.

A first operation 228 may include requesting to access the application (e.g., app 425-*b*, app 425-*b*, app 525). The application may be associated with an identity provider (e.g., identity provider 515) and a datastore (e.g., datastore 430-*a*, datastore 530-*a*). As seen in FIG. 4C, the orchestrator 420-*c* receives an app request 441 to access the app 425-*c*. First operation 228 may be performed by one or more hardware processors configured by machine-readable instructions including a module that is the same as or similar to application request module 108, in accordance with one or more implementations.

A second operation 230 may include routing the request to an intermediary (e.g., orchestrator 420-*c*) prior to receipt by the application (e.g., app 425-*c*). In some examples, the intermediary redirects the request to the identity provider (e.g., identity provider 415-*c*) for authentication, wherein the authentication comprises (1) receiving application identity information at the identity provider from the user, and (2) authenticating the user with the application based at least in part on the application identity information. For example, as seen in FIG. 4C, the orchestrator 420-*c* (i.e., the intermediary) redirects, via one or more of redirect 442-*a* and redirect 442-*b*, the app request to one or more of the UE 405-*c* and the identity provider 415-*c*, respectively. Furthermore, the UE 405-*c* exchanges application identity information with the identity provider 415-*c* to authenticate 443 the user (i.e., associated with UE 405-*c*) with the identity provider 415-*c* and/or the app 425-*c*. Second operation 230 may be performed by one or more hardware processors configured by machine-readable instructions including a module that is the same as or similar to request routing module 110, in accordance with one or more implementations.

A third operation 232 may include receiving user authentication confirmation at the intermediary. For example, in FIG. 4C, the orchestrator 420-*c* receives user authentication confirmation (via authorize 444) indicating that the UE 405-*c* is authorized to access the app 425-*c*. Third operation 232 may be performed by one or more hardware processors configured by machine-readable instructions including a module that is the same as or similar to application request module 108 and/or user data adding module 114, in accordance with one or more implementations.

A fourth operation 234 may include generating at the intermediary, such as orchestrator 420-*c*, a temporary user credential associated with the user and/or the application (e.g., app 425-*c*). Fourth operation 234 may be performed by one or more hardware processors configured by machine-readable instructions including a module that is the same as or similar to request routing module 110 or user data adding module 114, in accordance with one or more implementations.

A fifth operation 234 may comprise providing the request to access the application (e.g., received in first operation 228) with the temporary user credential from the intermediary (e.g., intermediary or orchestrator 420-*c*) to the application, such as app 425-*c*. For example, in FIG. 4C, the orchestrator 420-*c* provides the request to access the app 425-*c* and the temporary user credential to the app 425-*c*. Fifth operation 234 may be performed by one or more hardware processors configured by machine-readable instructions including one or more modules that are the same as or similar to one or more of application request module 108, request routing module 110, and user data adding module 114, in accordance with one or more implementations.

A sixth operation 238 may comprise capturing, at the intermediary, a backchannel request from the application to a datastore (e.g., datastore 430-*a*). In some cases, the backchannel request may include the temporary user credential. Sixth operation 238 may be performed by one or more hardware processors configured by machine-readable instructions including a module that is the same as or similar to one or more of application request module 108, request routing module 110, and user data adding module 114, in accordance with one or more implementations.

A seventh operation 240 may include confirming, at the intermediary, that the temporary user credential (e.g., provided in the backchannel request from the application to the datastore) matches the previously generated temporary user credential (e.g., previously generated at the intermediary in fourth operation 234). Seventh operation 240 may be performed by one or more hardware processors configured by machine-readable instructions including a module that is the same as or similar to request routing module 110, in accordance with one or more implementations.

An eighth operation 242 may include sending a confirmation from the intermediary to the application. In some examples, the confirmation may include a message or dataflow indicating that the temporary user credential enables user access to the application. Eighth operation 242 may be performed by one or more hardware processors configured by machine-readable instructions including a module that is the same as or similar to the application request module 108 or the request routing module 110, in accordance with one or more implementations.

A ninth operation 244 may include, in response to the request to access the application from the user, sending a communication from the application to the user granting the user access to the application. For example, in FIG. 4C, following confirmation 447, the app 425-*c* transmits an app response 448 (i.e., a communication) to the UE 405-*c*, where the app response 448 grants user access to the app 425-*c*. Ninth operation 244 may be performed by one or more hardware processors configured by machine-readable instructions including a module that is the same as or similar to the application request module 108, in accordance with one or more implementations.

FIG. 4A illustrates an example of a swim diagram 400-*a* depicting a method for analyzing authentication and authorization requirements in an identity infrastructure, in accordance with various aspects of the disclosure. In some cases, the identity infrastructure may be similar or substantially similar to the identity infrastructure 500 described below in relation to FIG. 5. The identity infrastructure may include a user equipment (UE) 405-*a* running a browser 410-*a*, an identity provider 415-*a*, an intermediary or orchestrator 420, an app 425-*a*, and a datastore 430-*a*.

The method described in relation to FIG. 4A may be implemented using a computing platform (or computing system) that may be similar or substantially similar to the system 100 previously described in relation to FIG. 1. In this example, the system performing the analyzing of authentication and authorization requirements is depicted as the orchestrator 420 (also referred to as intermediary 420).

As seen, the orchestrator 420 intercepts an app request 401 to access an application (e.g., app 425) from the UE 405-*a*. The UE 405-*a* may be associated with an end-user (e.g., an employee trying to remotely access the app 425-*a*, a customer trying to access a third-party app of a business). In some examples, the end-user may generate the app request 401 for accessing the application 425-*a* from the web browser 410-*a* on the UE 405-*a*. In other cases, the UE 405-*a* may directly transmit the app request 401 to the application 425-*a*, in which case the app request 401 is rerouted to the system (i.e., intermediary or orchestrator 420). In some examples, the orchestrator 420 may be configured with specific identity/authentication providers (e.g., PING, OKTA, MICROSOFT AZURE, to name a few non-limiting examples). In such cases, the orchestrator 420 may redirect the UE 405-*a* to the appropriate identity provider used to access the app 425. For example, the orchestrator 420-*a* redirects the UE 405-*a* to the identity provider 415-*a* via one or more of redirect 402-*a* and redirect 402-*b*. In some cases, the orchestrator 420-*a* may directly instruct (e.g., via redirect 402-*a*) the UE 405-*a* to authenticate with the identity provider 415-*a*. Additionally, or alternatively, the orchestrator 420-*a* may instruct (e.g., via redirect 402-*b*) the identity provider to initiate an authentication procedure with the UE 405-*a*. In some embodiments, one or more of the redirect 402-*a* and the redirect 402-*b* may include the redirected app request 401. Next, at authenticate 403, the end-user (via the UE 405-*a*) authenticates themselves (e.g., by providing a username and password, multi-factor authentication (MFA) information, answers to one or more security questions, biometrics data, or any other applicable authentication information) with the identity provider 415-*a*.

Once the end-user is authenticated with the identity provider 415-*a* (authenticate 403) and transmits the confirmation of this authentication to the orchestrator 420 (authorize 404), the intermediary or orchestrator 420-*a* may generate a one-time credential (e.g., a temporary user credential, such as a one-time password or OTP specific to the end-user). In some embodiments, the orchestrator 420-*a* transmits this temporary user credential to the datastore 430-*a* in update 405. In some cases, the datastore 430-*a* is updated using this temporary user credential, for instance, by inserting the temporary user credential into the datastore 430-*a*. In addition to the temporary user credential, in some cases, the datastore 430-*a* is also updated with the end-user's username and any other applicable user information (e.g., user attributes, such as, but not limited to, first name, last name, email address, department, organization, zone info, locale, picture, and/or date of birth).

In some cases, the datastore 430-*a* may be the legacy or "old datastore" that is utilized by the application 425-*a* to grant/deny application access requests (e.g., app request 401). Furthermore, the identity provider 415-*a* (e.g., a new identity provider used by an enterprise after migrating between an old IAM system to a new IAM system) only allows users with partial access to the company's resources (e.g., access to internal documents, emails, messaging apps, etc.), while the application 425-*a* is still tied to the legacy identity datastore 430-*a*. In some circumstances, migrating the application 425-*a* to the new identity provider, such as identity provider 415-*a*, may be cumbersome and/or costly as the application 425-*a* might need to be updated (or even rewritten, in some cases) to ensure compatibility with the identity provider 415-*a*. To alleviate these issues, some aspects of the present disclosure are directed to a technique for making the authentication process with an application "transparent" to the application, which enables the identity infrastructure associated with the application to be modernized without altering the application's own internal understanding of the authentication process. For example, the identity provider 415-*a* may be an example of a new identity provider (i.e., not the original identity provider associated with the app 425-*a*) used for controlling user access to the app 425-*a*. Furthermore, the datastore 430-*a* may be associated with the original identity provider and may also be utilized to help control user access to the app 425-*a*. In some cases, the app 425-*a* may be "unaware" of the identity provider 415-*a* and may only interact with the orchestrator 420-*a* and the datastore 430-*a* during the authentication and authorization process. Furthermore, the orchestrator 420-*a* (or intermediary 420-*a*) serves as a proxy between the new identity provider 415-*a* and the app 425-*a*, which allows access to the app 425-*a* to be controlled via the new identity provider 415-*a* while making minimal to no changes to the app 425-*a* and/or with respect to how the app 425-*a* interacts with the end-user (i.e., user associated with UE 405-*a*). In some cases, the intermediary or orchestrator 420-*a* updates the datastore 430-*a* with relevant information, i.e., once the UE 405-*a* is authenticated and authorized to access the app 425-*a*, which allows the app 425-*a* to interact with the datastore 430-*a* in the same or substantially the same way as it did before the new identity provider 415-*a*.

In some embodiments, during authentication 406, the orchestrator 420 forwards the user's original request (i.e., app request 401) to access the app 425-*a* to the application and attempts to log into the app 425-*a* using the temporary user credential (e.g., OTP) previously generated by the orchestrator 420-*a* and transmitted to the datastore 430-*a*. During verification 407, the app 425-*a* verifies the user credentials (e.g., username) and/or temporary user credential (e.g., OTP) provided by the intermediary or orchestrator 420-*a* with the credentials information stored in the datastore 430. Since the orchestrator 420-*a* had previously updated the credentials information (e.g., user's password entry) in the datastore 430-*a* with the OTP it generated (i.e., following successful authentication by the identity provider 415-*a*), the app 425-*a* is able to confirm that the credentials information (e.g., user credentials, such as username; temporary user credential, such as OTP) provided by the orchestrator 420-*a* are identical/match with the credentials information stored in the datastore 430-*a*. Following verification 407, the app 425-*a* transmits a message (e.g., in app response 408) to the end-user (i.e., associated with UE 405-*a*) including an indication that the end-user is now authorized to access the app 425-*a*.

In this way, the orchestrator 420-*a* may act as an intermediary to facilitate authentication with various identity providers, while alleviating the need to rewrite the original application logic (e.g., how the app 425-*a* verifies that the UE 405-*a* has been successfully authenticated and/or whether the UE 405-*a* is authorized to access the app 425-*a*). In some examples, the orchestrator 420 is configured to insert a temporary user credential (e.g., one-time credential, such as an OTP, another unique identifier, etc.) specific to the end-user and the identity session into different types of identity datastores (e.g., datastore 430-*a*). Some non-limiting examples of identity datastores that the intermediary or orchestrator 420-*a* may interact with, for instance, to insert OTPs that were pre-emptively generated by the orchestrator 420-*a*, may include a MySQL datastore and a lightweight directory access protocol (LDAP) datastore. It should be noted that other types of identity datastores are also contemplated in different embodiments and the examples listed herein are not intended to be limiting. Additionally, or alternatively, the method flow described in relation to FIG. 4A may also be used to retrieve user information from an identity provider, such as AZURE or OKTA, and then update the corresponding information (e.g., user credentials information, MFA, passcode, answers to security questions, to name a few non-limiting examples) in the datastore 430-*a* utilized by the app 425-*a*. This may help the app 425-*a* enhance user experience (e.g., provide a more seamless user experience), as the user information retrieved (from the datastore 430-*a*) by the app 425-*a* for authorizing user access to the app 425-*a* may correspond to the user information already used by the identity provider 415-*a* for authenticating the end-user.

Figure 4B:
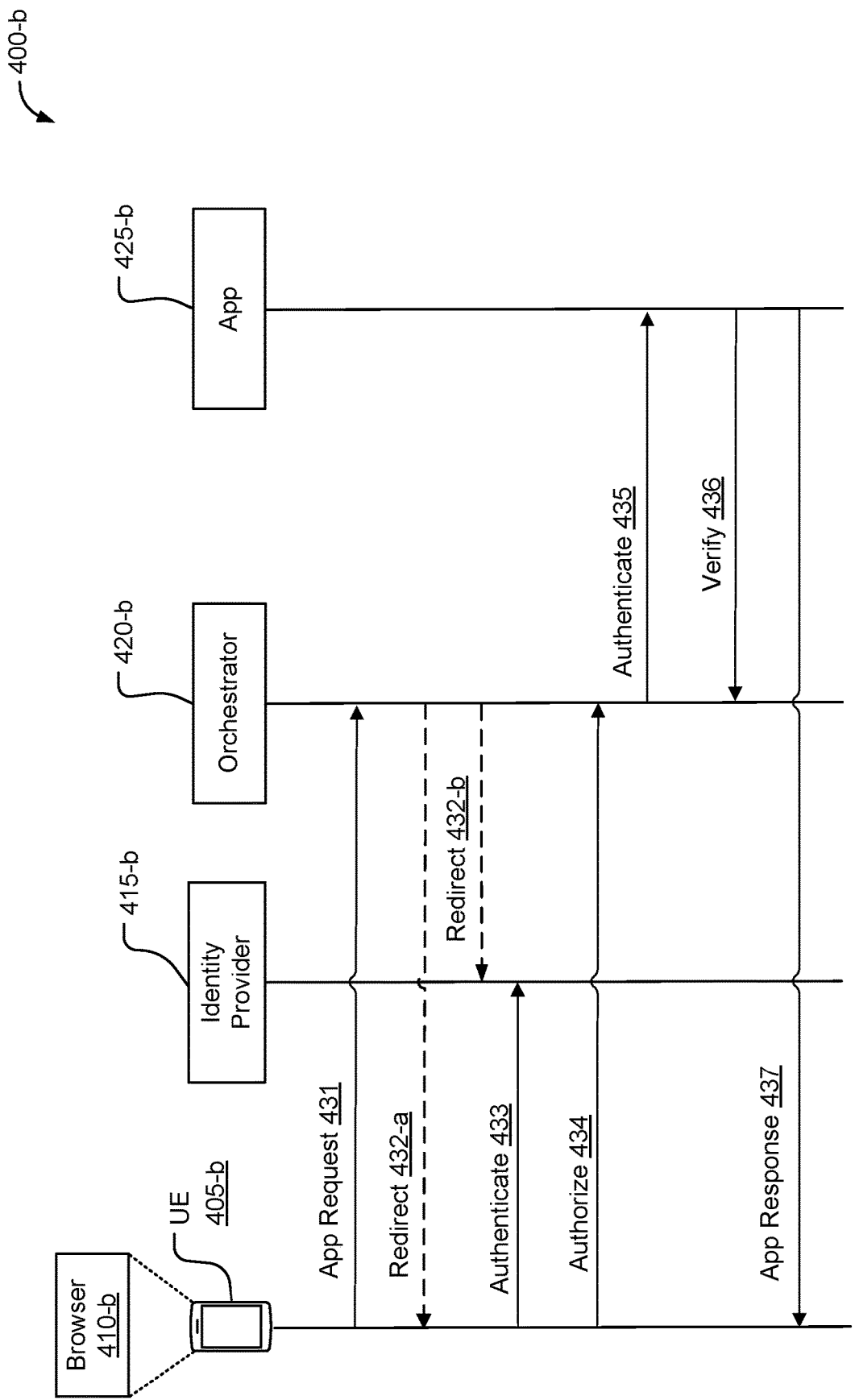
FIG. 4B illustrates another swim diagram representation of a method for controlling user access to an application, in accordance with various aspects of the disclosure.
Figure 4C:
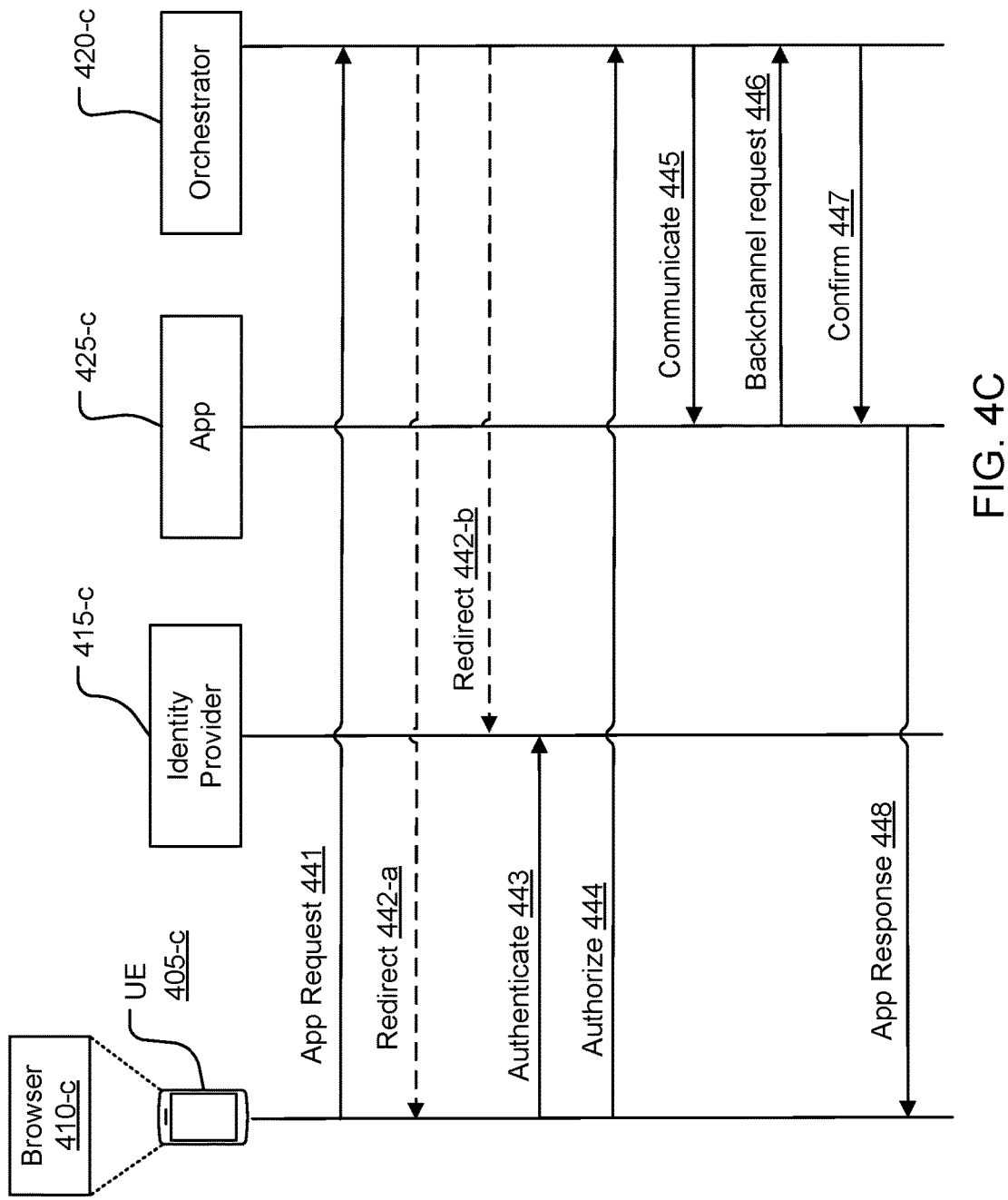
FIG. 4C illustrates another swim diagram representation of a method for controlling user access to an application, in accordance with various aspects of the disclosure.

In some other cases, the intermediary or orchestrator 420-*a* may serve as the identity store interface (e.g., for a new identity datastore) and/or intercept requests from the app 425-*a* to another identity datastore (e.g., an old identity datastore), further described in relation to FIG. 4B. This allows the orchestrator 420-*a* to partially proxy or even completely emulate the existing datastore (i.e., the old identity datastore, such as datastore 430-*a*). In this way, the orchestrator 420-*a* facilitates decoupling the app 425-*a* from the old identity datastore (shown as datastore 430-*a* in FIG. 4A) and prevents the need to rewrite the app 425-*a*, for instance, by acting as a new identity data store that will replace the old datastore 430-*a*.

As used herein, the term "partially proxying" as it relates to datastores may refer to a situation whether the orchestrator 420-*a* may support certain subset of functionality of the old identity datastore, such as datastore 430-*a*. That is, the orchestrator 420-*a* may or may not need to completely support all the features and functionality of the datastore 430-*a*. For example, the orchestrator 420-*a* may support one or more features of the datastore 430-*a* currently utilized by the application 425-*a*. In this way, the application 425-*a* can still use the orchestrator 420-*a* in its specific way to verify against. That is, the orchestrator 420-*a* may capture all (or most) of the data traffic sent from the application to the datastore and a portion of that data traffic may be forwarded onto the datastore, while other data traffic may be terminated at the orchestrator 420-*a*. In such cases, the orchestrator 420-*a* may respond directly to the application 425-*a* with its own response.

It should be noted that, the identity provider 415-*a* described herein may be used by the orchestrator 420-*a* to provide a newer more modern means of authentication.

FIG. 4B illustrates another example of a swim diagram 400-*b* depicting a method for analyzing authentication and authorization requirements in an identity infrastructure, in accordance with various aspects of the disclosure. In some cases, the identity infrastructure may be similar or substantially similar to the identity infrastructure 500 described below in relation to FIG. 5. The identity infrastructure may include a UE 405-*b* running a browser 410-*b*, an identity provider 415-*b*, an intermediary or orchestrator 420-*b*, and an app **425-*b*. Swim diagram 400-*b* implements one or more aspects of the swim diagram 400-*a*, previously described in relation to FIG. 4**A.

In this example, the app **425-*b* works in conjunction with the orchestrator 420-*b* to authenticate user request(s) to access the app 425-*b*. In some embodiments, the orchestrator 420-*b* may partially or even completely emulate the existing datastore (e.g., datastore 430-*a* in FIG. 4A) utilized with the app 425-*b*, which facilitates decoupling the app 425-*b* from the old/existing datastore. As shown, the intermediary or orchestrator 420-*b* receives an app request 431 from the UE 405-*b*, where the app request 431 includes a request to access the app 425-*b*. In some cases, the orchestrator 420-*b* redirects the end-user to authenticate with the new identity provider 415-*b* via one or more of redirect 432-*a* and redirect 432-*b*. In some cases, the intermediary or orchestrator 420-*b* may directly instruct (e.g., via redirect 432-*a*) the UE 405-*b* to authenticate with the identity provider 415-*b*. Additionally, or alternatively, the orchestrator 420-*b* may instruct (e.g., via redirect 402-*b*) the identity provider 415-*b* to initiate an authentication procedure with the UE 405-*b*. In some embodiments, one or more of the redirect 432-*a* and the redirect 432-*b* may include the redirected app request 431**.

Next, the UE **405-*b* authenticates 433 with the identity provider 415-*b* by providing one or more of a username and password, MFA information, answers to one or more security questions, biometrics data, or any applicable information used by the identity provider 415-*b* for authenticating the end-user. Once the end-user is successfully authenticated by the identity provider 415-*b*, the UE 405-*b* transmits a confirmation of this authentication to the orchestrator 420-*b*. For instance, following authenticate 433 with the identity provider 415-*b*, the UE 405-*b* transmits authorize 434 to the orchestrator 420-*b* indicating that the end-user has been authenticated with the identity provider 415-*b* and authorized to access the app 425-*b*. In some embodiments, the orchestrator 420-*b* then generates a temporary user credential (e.g., a one-time password or OTP, or another applicable temporary user credential), and transmits the temporary user credential along with other user information (e.g., username, email, location, role, department, etc.) to the app 425-*b*. In this example, the app 425-*b* has been decoupled from the old identity datastore (shown as datastore 430-*a* in FIG. 4A) and instead verifies the user credentials information with the orchestrator 420-*b*, where the orchestrator 420-*b* emulates the old identity datastore associated with the app 425-*b*. In some cases, the orchestrator 420-*b* authenticates 435 the end-user with the app 425-*b* using the temporary user credential. Next, the app 425-*b* verifies 436 the user credentials information with the orchestrator 420-*b*. After verification of user credentials information, the app 425-*b* transmits an app response 437 to the UE 405-*b*, where the app response 437 includes an indication of whether the end-user was granted or denied access to the app 425-*b***.

FIG. 4C illustrates an example of a swim diagram **400-*c* depicting a method for analyzing authentication and authorization requirements in an identity infrastructure, in accordance with various aspects of the disclosure. In some cases, the identity infrastructure may be similar or substantially similar to the identity infrastructure 500 described below in relation to FIG. 5. The identity infrastructure may include a user equipment (UE) 405-*c* running a browser 410-*c*, an identity provider 415-*c*, an intermediary or orchestrator 420-*c*, an app 425-*c***, and an optional datastore (not shown).

The method described in relation to FIG. 4C may be implemented using a computing platform (or computing system) that may be similar or substantially similar to the system 100 previously described in relation to FIG. 1. In this example, the system performing the analyzing of authentication and authorization requirements is depicted as the orchestrator **420-*c* (also referred to as intermediary 420-*c***).

In some cases, the intermediary or orchestrator **420-*c* may serve as the identity store interface (e.g., for a new identity datastore) and/or intercept requests from the app 425-*c* to another identity datastore (e.g., an old identity datastore). This allows the orchestrator 420-*c* to partially proxy or even completely emulate the existing datastore (i.e., the old identity datastore, such as datastore 430-*a*). In this way, the orchestrator 420-*c* facilitates decoupling the app 425-*c* from the old identity datastore (shown as datastore 430-*a* in FIG. 4A) and prevents the need to rewrite the app 425-*c***, in accordance with various aspects of the disclosure.

As seen, the orchestrator **420-*c* intercepts an app request 441 to access an application (e.g., app 425-*c*) from the UE 405-*c*. The UE 405-*c* may be associated with an end-user (e.g., an employee trying to remotely access the app 425-*c*, a customer trying to access a third-party app of a business). In some examples, the end-user may generate the app request 441 for accessing the application 425-*c* from the web browser 410-*c* (or another user interface) on the UE 405-*c*. In other cases, the UE 405-*c* may directly transmit the app request 401 to the application 425-*c*, in which case the app request 441 is rerouted to the system (i.e., intermediary or orchestrator 420-*c*). In some examples, the orchestrator 420-*c* may be configured with specific identity/authentication providers (e.g., PING, OKTA, MICROSOFT AZURE, to name a few non-limiting examples). In such cases, the orchestrator 420-*c* may redirect the UE 405-*c* to the appropriate identity provider used to access the app 425-*c*. For example, the orchestrator 420-*c* redirects the UE 405-*c* to the identity provider 415-*c* via one or more of redirect 442-*a* and redirect 442-*b*. In some cases, the orchestrator 420-*c* may directly instruct (e.g., via redirect 442-*a*) the UE 405-*c* to authenticate with the identity provider 415-*c*. Additionally, or alternatively, the orchestrator 420-*c* may instruct (e.g., via redirect 442-*b*) the identity provider 415-*c* to initiate an authentication procedure with the UE 405-*c*. In some embodiments, one or more of the redirect 402-*c* and the redirect 402-*c* may include the redirected app request 441**.

Next, at authenticate 443, the end-user (via the UE **405-*c*) authenticates themselves (e.g., by providing a username and password, multi-factor authentication (MFA) information, answers to one or more security questions, biometrics data, or any other applicable authentication information) with the identity provider 415-*c***.

Once the end-user is authenticated with the identity provider **415-*c* (authenticate 443) and transmits the confirmation of this authentication to the orchestrator 420-*c* (authorize 444), the intermediary or orchestrator 420-*c* may generate a temporary user credential (e.g., one-time credential) specific to the application and/or the end-user. In some embodiments, the orchestrator 420-*c* communicates 445 with the app 425-*c*, where the communication 445 comprises providing, from the intermediary to the application, the request to access the application 425-*c*** with the temporary user credential.

In some cases, the datastore (not shown) may be the legacy or "old datastore" that is utilized by the application **425-*c* to grant/deny application access requests (e.g., app request 441). Furthermore, the identity provider 415-*c*** (e.g., a new identity provider used by an enterprise after migrating between an old IAM system to a new IAM system) only allows users with partial access to the company's resources (e.g., access to internal documents, emails, messaging apps, etc.), while the application 425-c is still tied to the legacy identity datastore. In some circumstances, migrating the application 425-c to the new identity provider, such as identity provider 415-c, may be cumbersome and/or costly as the application 425-c might need to be updated (or even rewritten, in some cases) to ensure compatibility with the identity provider 415-c. To alleviate these issues, some aspects of the present disclosure are directed to a technique for making the authentication process with an application "transparent" to the application, which enables the identity infrastructure associated with the application to be modernized without altering the application's own internal understanding of the authentication process. For example, the identity provider 415-c may be an example of a new identity provider (i.e., not the original identity provider associated with the app 425-c) used for controlling user access to the app 425-c. Furthermore, the datastore may be associated with the original identity provider and may also be utilized to help control user access to the app 425-c. In FIG. 4C, the intermediary or orchestrator 420-c is configured to emulate the legacy datastore, which allows decoupling the datastore from the application. In some cases, the app 425-c may be "unaware" of the identity provider 415-a and may only interact with the orchestrator 420-c. Furthermore, the application 425-c may attempt to exchange information with the legacy datastore, but the orchestrator/intermediary 420-c captures a backchannel request 446 from the application 425-c to the datastore and applies one or more authorization decisions to determine whether the user is authorized to access the application.

For instance, as shown in FIG. 4C, the intermediary/orchestrator 420-c captures a backchannel request 446 from the application 425-c to the datastore. Specifically, but without limitation, the application attempts to send the temporary user credential (e.g., in the backchannel request 446) to the datastore, where the sending is intercepted (i.e., captured) at the orchestrator 420-c. After capturing the backchannel request 446, the orchestrator 420-c may confirm that the provided temporary user credential (e.g., sent in the backchannel request 446) matches the previously generated temporary user credential (i.e., temporary user credential previously generated at the orchestrator 420-c). In some cases, the orchestrator 420-c may send a confirmation 447 to the application 425-c, where the confirmation 447 includes an indication that the temporary user credential enables user access to the application 425-c. In such cases, the application 425-c then transmits an app response 448 to the UE 405-c, where the app response 450 grants the user access to the application 425-c.

In some embodiments, the backchannel request 446 may include one or more of the username and the generated temporary user credential. However, it is contemplated that additional types of information may also be included in the backchannel request 446 in different embodiments.

FIG. 5 illustrates a block diagram of a system 500 configured for controlling user access to an application (or app), according to various aspects of the disclosure.

The system 500 may implement one or more aspects of the system 100 described in relation to FIG. 1. As seen, the system 500 comprises a UE 505 associated with a user 550, an intermediary or orchestrator 520, an identity provider 515, a first datastore 530-a, and a second datastore 530-b. In some embodiments, the identity provider 515 comprises an attributes system 526 linked or associated with a LDAP 533-b for gathering identity attributes, an access system 523 supporting an Identity as a Service (IDaas) 531 for authorization, and an authenticate system 521 supporting MFA 529-a. In some cases, the access system 523 may enforce decisions about authentication and authorization set by the IDaaS 531. Furthermore, the identity provider 515 may be used to control user access to one or more app(s) 525. The various identity infrastructure elements (e.g., identity provider 515, orchestrator 520, datastores 530, etc.) may communicate using dataflows 569, which may be examples of bi-directional dataflows. For example, orchestrator 520 can communicate with the datastore 530-a using dataflow 569-d, with the app(s) 525 using dataflow 569-g, with the identity provider 515 using dataflow 569-c, and so on. Similarly, the datastore 530-a can communicate with the datastore 530-b using dataflow 569-h, and with the app(s) 525 using dataflow 569-f. In some cases, the UE 505 can communicate with the identity provider 515 using dataflow 569-e and with the orchestrator 520 using dataflows 569-a and 569-b.

In some embodiments, the UE 505 may transmit a request to access the app 525 using dataflow 569-a. In some cases, the app 525 may be associated with the identity provider 515 and the datastore 530-a. The datastore 530-a may include or store user credentials, such as, but not limited to, legacy user credentials. In some examples, the datastore 530-a may comprise a legacy identity and access management (IAM) system datastore associated with the app 525. Furthermore, the datastore 530-a may comprise LDAP 533-a and a database 531-a. In some implementations, requesting to access the application may include a plurality of separate requests to access the application.

In some cases, the orchestrator 520 intercepts this request to access the app, i.e., prior to receipt by the app 525. The intermediary or orchestrator 520 may also redirect the request (e.g., using dataflow 569-c) to the identity provider 515 for authentication. In some embodiments, the intermediary or orchestrator 520 may be configured as a proxy (e.g., AppGateway proxy) for the identity provider 515, for instance, before the orchestrator 520 redirects the request (e.g., app request received in dataflow 569-a) to the identity provider 515 for authentication. In some examples, the authentication may include receiving, at the identity provider 515, application identity information from the user 550, where the application identity information may be received in dataflow 569-e. In some examples, the authentication may include authenticating the user 550 with the app 525 based at least in part on the application identity information. FIG. 5 also shows an authenticate system 521 at the identity provider 515, where the authenticate system 521 may be utilized for authenticating the user 550 with the app 525. Additionally, the access system 523 at the identity provider 515 may be utilized for determining whether the user 550 is authorized to access the app 525, based at least in part on the application identity information received from the user 550 in dataflow 569-e.

Once authenticated, the UE 505 and/or the identity provider 515 transmits a message confirming user authentication to the orchestrator 569-c, where the user authentication confirmation message may be received in dataflow 569-b and/or 569-c. In some cases, a temporary user credential (e.g., OTP) associated with the app 525 may be generated at the intermediary or orchestrator 520. In some examples, generating the temporary user credential at the intermediary (i.e., orchestrator 520) may include generating a temporary user credential for each of the plurality of separate requests to access the application 525. The orchestrator 520 then transmits the temporary user credential in dataflow 569-d to the datastore 530-*a*. In some cases, this temporary user credential may be saved at the datastore 530-*a*, for instance, in database 531-*a*.

In some cases, saving the temporary user credential at the datastore 530-*a* may include providing the intermediary (e.g., orchestrator 520) with read/write datastore access, where the read/write datastore access may be provided from the application (e.g., app 525) prior to saving the temporary user credential at the datastore 530-*a*. In some cases, saving the temporary user credential (e.g., received in dataflow 569-*d*) at the datastore 530-*a* may further comprise using the application identity information to access user information at the datastore 530-*a*, and replacing at least a portion of the application identity information with the temporary user credential at the datastore 530-*a*. The datastore 530-*a* may include a LDAP datastore, although other types of datastores (e.g., MySQL datastore) are also contemplated in different embodiments. In some implementations, saving the temporary user credential at the datastore 530-*a* may include replacing the legacy user credentials (e.g., password) in the datastore 530-*a* with the temporary user credential (e.g., one-time password or OTP).

In some cases, the orchestrator 520 may also provide the request to access the application to the app 525, e.g., in dataflow 569-*g*. In some cases, the dataflow 569-*g* may also include the temporary user credential (e.g., OTP) previously generated at the orchestrator 520. Next, the app 525 transmits the temporary user credential received from the orchestrator 520 to the datastore 530-*a*, where the temporary user credential is included in dataflow 569-*f*. In some cases, sending the temporary user credential from the application 525 to the datastore 530-*a* may include utilizing an application algorithm to verify the temporary user credential against the datastore 530-*a*. That is, sending the temporary user credential from the app 525 to the datastore 530-*a* may include at least verifying the temporary user credential against information stored in the datastore 530-*a*. Additionally, or alternatively, sending the temporary user credential from the application 525 to the datastore 530-*a* may include intercepting the sending by the intermediary (or orchestrator 520). For instance, in one non-limiting example, the intermediary or orchestrator 520 may intercept the sending of the temporary user credential from the app 525 to the datastore 530-*a*. Once the datastore 530-*a* receives this temporary user credential from the app 525, it compares it with the stored temporary user credential to evaluate whether the user 550 should be granted access to the app 525. In some examples, the datastore 530-*a* may inform the application 525, e.g., using dataflow 569-*f*, that the temporary user credential enables user access to the application.

In some cases, the application 525 may send a communication (in dataflow 569-*i*) to the user 550 granting the user access to the application, i.e., in response to the request to access the application from the user. In some examples, sending confirmation from the datastore 530-*a* to the application 525 that the temporary user credential enables user access to the application 525 may include sending the confirmation (in dataflow 569-*d*) from the datastore 530-*a* to the intermediary (e.g., orchestrator 520), and then from the intermediary to the application 525. For example, the orchestrator 520 may send a confirmation to the identity provider 515 in dataflow 569-*c*, or alternatively, to the app 525 in dataflow 569-*g*, that the temporary user credential enables user access to the app 525. Additionally, or alternatively, sending confirmation from the datastore (e.g., datastore 530-*a*) to the application (e.g., app 525) that the temporary user credential enables user access to the application 525 includes applying one or more authorization decisions (e.g., employing one or more access rules) to determine whether the user 550 may access the application.

In some embodiments, additional user data may be added to the datastore 530-*a*. By way of non-limiting example, the additional user data may include at least one of a user first name, a user last name, a job title, a physical address, and an email address. Other types of user data may be added to the datastore 530-*a*, and the examples listed herein are not intended to be limiting. For example, additional user data may also include one or more of a unique identifier number (e.g., social security number or SSN, cellphone number, date of birth, date of birth appended with last 4 digits of SSN) specific to each user, an employee ID number (if applicable), an alternate email address and/or phone number, to name a few non-limiting examples. In some non-limiting examples, adding additional user data to the datastore, such as, but not limited to, datastore 530-*a*, may include providing additional user data from the second datastore 530-*b* to the first datastore 530-*a*. By way of non-limiting example, the second datastore 530-*b* may include a datastore which one of, uses a standard identity protocol (e.g., identity protocol 543), and leverages multi-factor authentication or MFA 529-*b*. By way of non-limiting example, the standard identity protocol, such as identity protocol 543, may include at least one of OpenID Connect (OIDC), Security Assertion Markup Language (SAML), and WebAuthn. Other types of identity protocols are contemplated in different embodiments, and the examples listed herein are not intended to limit the scope or spirit of this disclosure. In some cases, receiving application identity information at the identity provider 515 from the user 550 may include adding the user and one or more user attributes (e.g., email address, phone number, residential address, job title, department, employee ID, etc.) to one or more of the datastores 530-*a* and 530-*b*.

In some cases, the datastores 530-*a* and/or 530-*b* may include a plurality of user data associated with the application (e.g., app 525). By way of non-limiting example, the user data may include at least one of a user identifier, a user first name, a user last name, and information related to a unique identifier number specific to the user, such as, but not limited to, an employee identification number, a social security number (SSN), and/or a mobile number. The user data may include data for use with one of data customization and authorization decisions and across a target identity domain (e.g., identity provider 515). Some non-limiting examples of the data for use with one of data customization and authorization decisions may include localization information, preferred language (e.g., English), and/or last login time (i.e., timestamp associated with most recent login). In some cases, adding additional user data to the datastore 530-*a* may comprise providing additional user data (e.g., in dataflow 569-*h*) from the second datastore 530-*b* and adding it to the first datastore 530-*a*.

In some embodiments, the system 500 may be configured to request to access the application. The system 500 may also be configured to route the request to an intermediary (e.g., orchestrator 420-*c*) prior to receipt by the application (e.g., app 425-*c*). In some examples, the intermediary redirects the request to the identity provider (e.g., identity provider 415-*c*) for authentication, wherein the authentication comprises (1) receiving application identity information at the identity provider from the user, and (2) authenticating the user with the application based at least in part on the application identity information. The system 500 may also be configured to exchange application identity information with the identity provider to authenticate the user with the identity provider and/or the application. The system 500 may also be configured to receive user authentication confirmation at the intermediary or orchestrator. The system 500 may also be configured to generate, at the intermediary, a temporary user credential associated with the user and/or the application. The system 500 may also be configured to provide the request to access the application with the temporary user credential from the intermediary (e.g., intermediary or orchestrator 420-*c*) to the application, such as app 425-*c*. The system 500 may also be configured to capture, at the intermediary, a backchannel request from the application to a datastore (e.g., datastore 430-*a*). The system 500 may also be configured to confirm, at the intermediary, that the temporary user credential (e.g., provided in the backchannel request from the application to the datastore) matches the previously generated temporary user credential. The system 500 may also be configured to send a confirmation from the intermediary to the application that the temporary user credential enables user access to the application. The system 500 may also be configured to, in response to the request to access the application from the user, send a communication from the application to the user granting the user access to the application.

Figure 3:
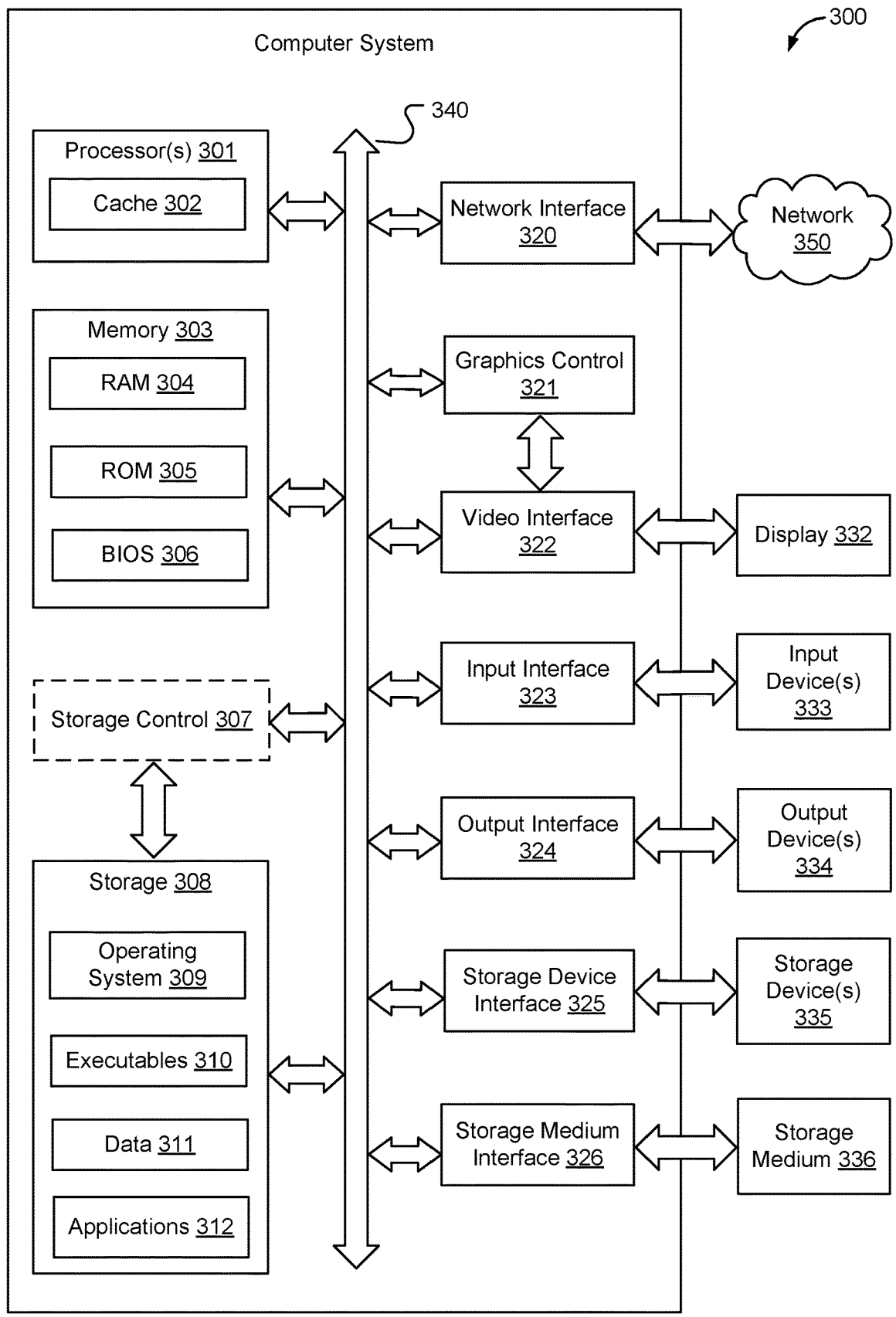
FIG. 3 illustrates a diagrammatic representation of a computer system configured for controlling user access to an application, in accordance with various aspects of the disclosure.

Turning now to FIG. 3, which illustrates a diagrammatic representation of one embodiment of a computer system 300, within which a set of instructions can execute for causing a device to perform or execute any one or more of the aspects and/or methodologies of the present disclosure. The components in FIG. 3 are examples only and do not limit the scope of use or functionality of any hardware, software, firmware, embedded logic component, or a combination of two or more such components implementing particular embodiments of this disclosure. Some or all of the illustrated components can be part of the computer system 300. For instance, the computer system 300 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 300 includes at least a processor 301 such as a central processing unit (CPU) or a graphics processing unit (GPU) to name two non-limiting examples. Any of the subsystems described throughout this disclosure could embody the processor 301. In some cases, the processor(s) 301 may comprise cache 302. The computer system 300 may also comprise a memory 303 and a storage 308, both communicating with each other, and with other components, via a bus 340. The bus 340 may also link a display 332, one or more input devices 333 (which may, for example, include a keypad, a keyboard, a mouse, a stylus, etc.), one or more output devices 334, one or more storage devices 335, and various non-transitory, tangible computer-readable storage media 336 with each other and/or with one or more of the processor 301, the memory 303, and the storage 308. All of these elements may interface directly or via one or more interfaces or adaptors to the bus 340. For instance, the various non-transitory, tangible computer-readable storage media 336 can interface with the bus 340 via storage medium interface 326. Computer system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 301 (or central processing unit(s)) optionally contains a cache memory unit 302 for temporary local storage of instructions, data, or computer addresses. Processor(s) 301 are configured to assist in execution of computer-readable instructions stored on at least one non-transitory, tangible computer-readable storage medium, such as, but not limited to, storage medium 336. Computer system 300 may provide functionality as a result of the processor(s) 301 executing software embodied in one or more non-transitory, tangible computer-readable storage media, such as memory 303, storage 308, storage devices 335, and/or storage medium 336 (e.g., read only memory (ROM)). Memory 303 may read the software from one or more other non-transitory, tangible computer-readable storage media (such as mass storage device(s) 335, storage medium(s) 336) or from one or more other sources through a suitable interface, such as network interface 320. Any of the subsystems herein disclosed could include a network interface such as the network interface 320. The software may cause processor(s) 301 to carry out one or more processes or one or more steps of one or more processes described or illustrated herein, including at least in relation to FIGS. 1, 2A-E, 4A-C, and/or 5. Carrying out such processes or steps may include defining data structures stored in memory 303 and modifying the data structures as directed by the software. In some embodiments, an FPGA can store instructions for carrying out functionality as described in this disclosure. In other embodiments, firmware includes instructions for carrying out functionality as described in this disclosure.

The memory 303 may include various components (e.g., non-transitory, tangible computer-readable storage media) including, but not limited to, a random-access memory component (e.g., RAM 304) (e.g., a static RAM "SRAM", a dynamic RAM "DRAM, etc.), a read-only component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable non-transitory, tangible computer-readable storage media. In some instances, ROM 305 and RAM 304 include non-transitory, tangible computer-readable storage media for carrying out a method, such as method(s) 200 described in relation to FIGS. 2A-E and/or the method(s) described in relation to the swim diagrams 400-*a*, 400-*b*, and/or 400-*c*. In some cases, the memory 303 may also comprise a basic input/output system (BIOS) 306. In one example, the BIOS 306, including basic routines that help to transfer information between elements within computer system 300, such as during start-up, may be stored in the memory 303.

Fixed storage 308 is connected bi-directionally to processor(s) 301, optionally through storage control unit 307. Fixed storage 308 provides additional data storage capacity and may also include any suitable non-transitory, tangible computer-readable media described herein. Storage 308 may be used to store operating system (OS) 309, executables (EXECs) 310, data 311, and/or applications 312 (e.g., API applications, application programs). Often, although not always, storage 308 is a secondary storage medium (such as a hard disk) that is slower than primary storage (e.g., memory 303). Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with computer system 300 (e.g., via an external port connector (not shown)) via a storage device interface 325. Particularly, storage device(s) 335 and an associated machine-readable medium may provide nonvolatile and/or volatile storage of machine-readable instructions, data structures, program modules, and/or other data for the computer system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 300 may also include an input device 333. In one example, a user of computer system 300 may enter commands and/or other information into computer system 300 via input device(s) 333. Examples of an input device(s) 333 include, but are not limited to, an alphanumeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when computer system 300 is connected to network 350, computer system 300 may communicate with other devices, such as mobile devices (e.g., UEs 405, 505) and enterprise systems, connected to network 350. Communications to and from computer system 300 may be sent through network interface 320. For example, network interface 320 may receive incoming communications (such as requests or responses from other devices) in the form of one or more packets (such as Internet Protocol (IP) packets) from network 350, and computer system 300 may store the incoming communications in memory 303 for processing. Computer system 300 may similarly store outgoing communications (such as requests or responses to other devices) in the form of one or more packets in memory 303 and communicated to network 350 from network interface 320. Processor(s) 301 may access these communication packets stored in memory 303 for processing.

Examples of the network interface 320 include, but are not limited to, a network interface card, a modem, and any combination thereof. Examples of a network 350 or network segment include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 350, may employ a wired and/or a wireless mode of communication. In general, any network topology may be used.

Information and data can be displayed through a display 332. Examples of a display 332 include, but are not limited to, a liquid crystal display (LCD), an organic liquid crystal display (OLED), a cathode ray tube (CRT), a plasma display, and any combinations thereof. The display 332 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321.

In addition to a display 332, computer system 300 may include one or more other peripheral output devices 334 including, but not limited to, an audio speaker, a printer, etc. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition, or as an alternative, computer system 300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an integrated circuit or IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module, such as the ones described in relation to FIG. 1, may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components, such as those in an FPGA, once programmed with the software module.

It is contemplated that one or more of the components or subcomponents described in relation to the computer system 300 shown in FIG. 3 such as, but not limited to, the network 350, processor 301, memory, 303, etc., may comprise a cloud computing system. In one such system, front-end systems such as input devices 333 may provide information to back-end platforms such as servers (e.g., computer systems 300) and storage (e.g., memory 303). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser (e.g., web browser 410-a in FIG. 4A).

Additional Embodiments

Some aspects of the disclosure are directed to a method (e.g., method 200-a) or system (e.g., system 100, system 500) for modernizing application authentication, comprising (1) authenticating users with modern/alternate means (e.g., using a new identity provider), (2) preparing the application's legacy identity store by setting temporary "one-time" credentials for the targeted user, (3) intercepting the application's authentication prompt/mechanism, (4) responding to the prompt with the user's "one-time" credentials, (5) confirming that the user is granted access, and (6) replacing or removing the user's "one-time" credentials from the legacy identity store. In some embodiments, the system, such as system 100 or 500, may help enhance the authentication process by layering on additional security, such as multi-factor authentication, IP address checking, etc. In some embodiments, the system may apply authorization decisions to the user's request (e.g., given that the user has authenticated, determine whether they should be allowed to access this application).

In some embodiments, the system may insert/migrate additional user information into the legacy identity store (e.g., datastore 530-a in FIG. 5). In this scenario, the application has historically used information from the legacy identity store for data customization, authorization decisions, etc. By inserting/migrating user information into the old identity datastore, the system facilitates data synchronization across the target identity domain. In cases, the legacy identity datastore may be furnished with additional information from the modern/new identity provider, for instance, if the application is still relying on the legacy identity datastore for accessing information, as described in relation to FIG. 4A. Alternatively, the identity provider represents the modern form of authentication that the intermediary/orchestrator may leverage, which allows decoupling the dependency of the legacy identity datastore from the application, as described in relation to FIGS. 4B-C.

In some examples, the system supports just-in-time (JIT) provisioning to legacy applications (e.g., app(s) 525). In some circumstances, the user (e.g., user 550) may not exist in the legacy identity store (e.g., no entry, credentials information, etc., may exist for the user 550 in the old identity datastore 530-a), but the techniques described herein can be used to add the user and their associated attributes to the legacy identity store at the time of initial access, which allows the application to act upon the user as if they had been provisioned in the past. In some examples, the system, such as system 500, may remove users and their associated attributes from the legacy identity store (e.g., datastore 530-a) upon logout or session expiration. This lends to additional security and data integrity.

Some other aspects of the disclosure are directed to a method for modernizing application authentication (e.g., see FIG. 4B), the method comprising: (1) authenticating users with modern/alternate means (e.g., using a new identity provider), (2) intercepting the application's authentication prompt/mechanism, (3) responding to the prompt with the user's "one-time" credentials, (4) intercepting the request from the application to the old/legacy identity datastore, e.g., by proxying and capturing LDAP, SQL requests, (5) confirm that the credentials match the expected one-time credentials, such as an OTP, (6) respond with appropriate authentication, and (7) confirm that the user is granted access to the app.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for controlling user access to an application, the system comprising:
one or more hardware processors configured by machine-readable instructions to:

request to access the application, wherein the application is associated with an identity provider and a datastore;
route the request to an intermediary prior to receipt by the application, wherein,
the intermediary redirects the request to the identity provider for authentication, and
the authentication comprises:
receiving application identity information at the identity provider from the user; and
authenticating the user with the application based at least in part on the application identity information;
receive user authentication confirmation at the intermediary;
generate at the intermediary a temporary user credential associated with the application;
provide, from the intermediary to the application, the request to access the application with the temporary user credential;
capture, at the intermediary, a backchannel request from the application to the data store, wherein the backchannel request includes the temporary user credential;
confirm, at the intermediary, that the temporary user credential provided in the backchannel request matches the temporary user credential generated previously;
send confirmation from the intermediary to the application that the temporary user credential enables user access to the application; and
in response to the request to access the application from the user, send a communication from the application to the user granting the user access to the application.

2. The system of claim 1, wherein requesting to access the application comprises a plurality of separate requests to access the application; and
wherein generating at the intermediary a temporary user credential comprises generating a temporary user credential for each of the plurality of separate requests to access the application.

3. The system of claim 1, wherein the datastore comprises a legacy identity and access management system (IAM) datastore associated with the application, and wherein the datastore comprise one of a MySQL datastore and a lightweight data access protocol (LDAP) datastore.

4. A method for controlling user access to an application, comprising:
requesting to access the application, wherein the application is associated with an identity provider and a datastore;
routing the request to an intermediary prior to receipt by the application, wherein,
the intermediary redirects the request to the identity provider for authentication, and
the authentication comprises:
receiving application identity information at the identity provider from the user; and
authenticating the user with the application based at least in part on the application identity information;
receiving user authentication confirmation at the intermediary;
generating at the intermediary a temporary user credential associated with the application;
providing, from the intermediary to the application, the request to access the application with the temporary user credential;
capturing, at the intermediary, a backchannel request from the application to the datastore, wherein the backchannel request includes the temporary user credential;
confirming, at the intermediary, that the temporary user credential provided in the backchannel request matches the temporary user credential generated previously;
sending confirmation from the intermediary to the application that the temporary user credential enables user access to the application; and
in response to the request to access the application from the user, sending a communication from the application to the user, granting the user access to the application.

5. The method of claim 4, wherein,
requesting to access the application comprises a plurality of separate requests to access the application; and
generating at the intermediary a temporary user credential comprises generating a temporary user credential for each of the plurality of separate requests to access the application.

6. The method of claim 4, wherein the datastore comprises a legacy identity and access management system (IAM) datastore associated with the application.

7. The method of claim 4, wherein the datastore comprise one of a MySQL datastore and a lightweight data access protocol (LDAP) datastore.

8. The method of claim 4, further comprising:
sending the temporary user credential from the application to the datastore; and
wherein capturing the backchannel request comprises intercepting the sending by the intermediary.

9. The method of claim 4, wherein sending confirmation from the intermediary to the application that the temporary user credential enables user access to the application comprises applying one or more authorization decisions to determine whether the user is authorized to access the application.

10. The method of claim 4, wherein the datastore comprises a plurality of user data associated with the application, the method further comprising:
adding additional user data to the datastore.

11. The method of claim 10, wherein,
the user data comprises at least one of a user identifier, a user first name, a user last name, and information related to an identifier number;
the user data comprises data for use:
with one of data customization and authorization decisions, and
across a target identity domain;
the datastore comprises a first datastore; and
adding additional user data to the datastore comprises providing additional user data from a second datastore to the first datastore.

12. The method of claim 11, wherein,
the second datastore comprises a datastore which one of,
uses a standard identity protocol, and
leverages multi-factor authentication; and
the additional user data comprises at least one of,
a user first name,
a user last name,
a job title,
a physical address, and
an email address.

13. The method of claim 12, wherein the standard identity protocol comprise at least one of:
OpenID Connect (OIDC);
Security Assertion Markup Language (SAML); and
Web Authentication (WebAuthn).

14. The method of claim 4, wherein receiving application identity information at the identity provider from the user comprises adding the user and one or more user attributes to the datastore.

15. The method of claim 14, further comprising:
removing the user and the one or more user attributes from the datastore upon one of:
user logout of the application; and
expiration of a user session with the application.

16. The method of claim 15, wherein, before the intermediary redirects the request to the identity provider for authentication, the method comprises:
configuring the intermediary as an Application Gateway proxy for the identity provider.

17. A non-transient computer-readable storage medium having instructions embodied thereon, the instructions being executable by one or more processors to perform a method for controlling user access to an application, the method comprising:
requesting to access the application, wherein the application is associated with an identity provider and a datastore;
routing the request to an intermediary prior to receipt by the application, wherein,
the intermediary redirects the request to the identity provider for authentication; and
the authentication comprises:
receiving application identity information at the identity provider from the user; and
authenticating the user with the application based at least in part on the application identity information;
receiving user authentication confirmation at the intermediary;
generating at the intermediary a temporary user credential associated with the application;
providing, from the intermediary to the application, the request to access the application with the temporary user credential;
capturing, at the intermediary, a backchannel request from the application to a datastore, wherein the backchannel request includes the temporary user credential;
confirming, at the intermediary, that the temporary user credential provided in the backchannel request matches the temporary user credential generated previously;
sending confirmation from the intermediary to the application that the temporary user credential enables user access to the application; and
in response to the request to access the application from the user, sending a communication from the application to the user granting the user access to the application.

18. The non-transient computer-readable storage medium of claim 17, wherein requesting to access the application comprises a plurality of separate requests to access the application; and
wherein generating at the intermediary a temporary user credential comprises generating a temporary user credential for each of the plurality of separate requests to access the application.

19. The non-transient computer-readable storage medium of claim 17, wherein the method further comprises:
sending the temporary user credential from the application to the datastore; and
wherein capturing the backchannel request comprises intercepting the sending by the intermediary.

20. The non-transient computer-readable storage medium of claim 17, wherein sending confirmation from the intermediary to the application that the temporary user credential enables user access to the application comprises applying one or more authorization decisions to determine whether the user is authorized to access the application.

* * * * *